(12) United States Patent
French et al.

(10) Patent No.: US 8,228,328 B1
(45) Date of Patent: Jul. 24, 2012

(54) EARLY Z TESTING FOR MULTIPLE RENDER TARGETS

(75) Inventors: Mark J. French, Raleigh, NC (US); Phillip Keslin, San Jose, CA (US); Steven E Molnar, Chapel Hill, NC (US); Adam Clark Weitkemper, Holly Springs, NC (US)

(73) Assignee: NVIDIA Corporation, Santa Clara, CA (US)

( * ) Notice: Subject to any disclaimer, the term of this patent is extended or adjusted under 35 U.S.C. 154(b) by 943 days.

(21) Appl. No.: 11/934,046

(22) Filed: Nov. 1, 2007

Related U.S. Application Data

(60) Provisional application No. 60/864,289, filed on Nov. 3, 2006.

(51) Int. Cl.
*G06T 15/40* (2011.01)
*G09G 5/36* (2006.01)
*G09G 5/37* (2006.01)

(52) U.S. Cl. ........ 345/421; 345/422; 345/554; 345/558; 345/559; 345/561

(58) Field of Classification Search .................. 345/421, 345/422, 554, 558, 559, 561
See application file for complete search history.

(56) References Cited

U.S. PATENT DOCUMENTS

| | | | |
|---|---|---|---|
| 4,807,183 A | | 2/1989 | Kung et al. |
| 5,224,093 A | * | 6/1993 | Denzel et al. ............... 370/417 |
| 5,371,849 A | * | 12/1994 | Peaslee et al. .............. 345/553 |
| 5,408,606 A | * | 4/1995 | Eckart ......................... 345/505 |
| 5,481,669 A | * | 1/1996 | Poulton et al. .............. 345/505 |
| 5,522,083 A | * | 5/1996 | Gove et al. .................. 712/22 |
| 5,550,962 A | | 8/1996 | Nakamura et al. |
| 5,574,847 A | * | 11/1996 | Eckart et al. ................ 345/505 |
| 5,574,874 A | | 11/1996 | Jones et al. |
| 5,684,939 A | | 11/1997 | Foran et al. |
| 5,794,016 A | * | 8/1998 | Kelleher ..................... 345/505 |
| 5,798,770 A | * | 8/1998 | Baldwin ...................... 345/506 |
| 5,808,617 A | | 9/1998 | Kenworthy et al. |
| 5,809,280 A | * | 9/1998 | Chard et al. ................. 711/160 |
| 5,818,456 A | | 10/1998 | Cosman et al. |
| 5,818,469 A | | 10/1998 | Lawless et al. |

(Continued)

FOREIGN PATENT DOCUMENTS

EP 1182618 A2 * 2/2002

OTHER PUBLICATIONS

ATI, "ATI Radeon X800 3D Architecture White Paper", ATI Developer Website, Oct. 2005, pp. 1-13.*

(Continued)

*Primary Examiner* — Joni Hsu
*Assistant Examiner* — Roberta D Prendergast
(74) *Attorney, Agent, or Firm* — Patterson & Sheridan, LLP

(57) ABSTRACT

The current invention involves new systems and methods for computing per-sample post-z test coverage when the memory is organized in multiple partitions that may not match the number of shaders. Shaded pixels output by the shaders can be processed by one of several z raster operations units. The shading processing capability can be configured independent of the number of memory partitions and number of z raster operations units. The current invention also involves new systems and method for using different z test modes with multiple render targets with a single or multiple memory partitions. Rendering performance may be improved by using an early z testing mode is used to eliminate non-visible samples prior to shading.

20 Claims, 13 Drawing Sheets

U.S. PATENT DOCUMENTS

| | | | | |
|---|---|---|---|---|
| 5,841,447 | A * | 11/1998 | Drews | 345/563 |
| 5,909,595 | A * | 6/1999 | Rosenthal et al. | 710/38 |
| 5,931,938 | A | 8/1999 | Drogichen et al. | |
| 5,943,060 | A | 8/1999 | Cosman et al. | |
| 5,949,428 | A | 9/1999 | Toelle et al. | |
| 5,999,183 | A * | 12/1999 | Kilgariff et al. | 345/418 |
| 6,072,500 | A * | 6/2000 | Foran et al. | 345/611 |
| 6,075,931 | A | 6/2000 | Panwar | |
| 6,088,043 | A * | 7/2000 | Kelleher et al. | 345/502 |
| 6,104,407 | A | 8/2000 | Aleksik et al. | |
| 6,118,452 | A * | 9/2000 | Gannett | 345/418 |
| 6,172,680 | B1 * | 1/2001 | Wong et al. | 345/581 |
| 6,249,288 | B1 | 6/2001 | Campbell | |
| 6,292,194 | B1 | 9/2001 | Powell, III | |
| 6,326,964 | B1 | 12/2001 | Synder et al. | |
| 6,385,715 | B1 * | 5/2002 | Merchant et al. | 712/219 |
| 6,433,788 | B1 * | 8/2002 | Morein | 345/557 |
| 6,469,707 | B1 | 10/2002 | Voorhies | |
| 6,489,966 | B1 * | 12/2002 | Kanzaki et al. | 345/613 |
| 6,515,661 | B1 | 2/2003 | Dawson | |
| 6,614,444 | B1 * | 9/2003 | Duluk et al. | 345/581 |
| 6,622,182 | B1 * | 9/2003 | Miller et al. | 710/29 |
| 6,633,297 | B2 | 10/2003 | McCormack et al. | 345/506 |
| 6,636,214 | B1 * | 10/2003 | Leather et al. | 345/422 |
| 6,639,595 | B1 | 10/2003 | Drebin et al. | |
| 6,646,639 | B1 * | 11/2003 | Greene et al. | 345/422 |
| 6,650,327 | B1 | 11/2003 | Airey et al. | |
| 6,664,958 | B1 * | 12/2003 | Leather et al. | 345/422 |
| 6,697,063 | B1 * | 2/2004 | Zhu | 345/421 |
| 6,707,458 | B1 * | 3/2004 | Leather et al. | 345/582 |
| 6,724,394 | B1 * | 4/2004 | Zatz et al. | 345/581 |
| 6,727,900 | B1 | 4/2004 | Nakamura | |
| 6,731,296 | B2 * | 5/2004 | Lewis et al. | 345/582 |
| 6,734,861 | B1 * | 5/2004 | Van Dyke et al. | 345/506 |
| 6,791,559 | B2 * | 9/2004 | Baldwin | 345/557 |
| 6,862,673 | B2 * | 3/2005 | Lee et al. | 711/169 |
| 6,864,893 | B2 * | 3/2005 | Zatz | 345/503 |
| 6,894,689 | B1 * | 5/2005 | Greene et al. | 345/422 |
| 6,897,871 | B1 * | 5/2005 | Morein et al. | 345/501 |
| 6,954,204 | B2 | 10/2005 | Zats et al. | |
| 6,961,057 | B1 | 11/2005 | Van Dyke et al. | |
| 6,961,065 | B2 * | 11/2005 | Sasaki | 345/582 |
| 6,961,803 | B1 | 11/2005 | Purcell et al. | |
| 6,999,076 | B2 * | 2/2006 | Morein | 345/422 |
| 7,006,110 | B2 | 2/2006 | Crisu et al. | |
| 7,023,437 | B1 | 4/2006 | Voorhies et al. | |
| 7,034,828 | B1 * | 4/2006 | Drebin et al. | 345/426 |
| 7,039,770 | B1 * | 5/2006 | Chen et al. | 711/151 |
| 7,053,893 | B1 * | 5/2006 | Molnar et al. | 345/426 |
| 7,110,007 | B2 | 9/2006 | Odagawa | |
| 7,564,460 | B2 * | 7/2009 | Boland et al. | 345/505 |
| 7,633,506 | B1 * | 12/2009 | Leather et al. | 345/506 |
| 2001/0018734 | A1 * | 8/2001 | Lie | 712/43 |
| 2002/0033828 | A1 | 3/2002 | Deering et al. | |
| 2002/0064154 | A1 | 5/2002 | Sharma et al. | |
| 2002/0091914 | A1 * | 7/2002 | Merchant et al. | 712/219 |
| 2002/0097241 | A1 | 7/2002 | McCormack et al. | |
| 2002/0180741 | A1 * | 12/2002 | Fowler et al. | 345/520 |
| 2003/0002729 | A1 | 1/2003 | Wittenbrink | |
| 2003/0014457 | A1 | 1/2003 | Desai et al. | |
| 2003/0016235 | A1 | 1/2003 | Odagawa | |
| 2003/0020741 | A1 * | 1/2003 | Boland et al. | 345/700 |
| 2003/0038803 | A1 * | 2/2003 | Morein et al. | 345/421 |
| 2003/0074178 | A1 | 4/2003 | Sample et al. | |
| 2003/0095134 | A1 | 5/2003 | Tuomi et al. | |
| 2003/0137520 | A1 | 7/2003 | Marino | |
| 2003/0154235 | A1 * | 8/2003 | Sager | 709/108 |
| 2003/0164824 | A1 | 9/2003 | Parsons et al. | |
| 2004/0012598 | A1 | 1/2004 | Zats | |
| 2004/0047209 | A1 * | 3/2004 | Lien et al. | 365/202 |
| 2004/0111489 | A1 | 6/2004 | Yamaguchi | |
| 2004/0172523 | A1 * | 9/2004 | Merchant et al. | 712/228 |
| 2004/0179020 | A1 | 9/2004 | Lewis et al. | |
| 2004/0196290 | A1 | 10/2004 | Satoh | |
| 2005/0044344 | A1 | 2/2005 | Stevens | |
| 2005/0068325 | A1 * | 3/2005 | Lefebvre et al. | 345/522 |
| 2005/0110792 | A1 * | 5/2005 | Morein et al. | 345/501 |
| 2005/0134873 | A1 * | 6/2005 | Kumar et al. | 358/1.9 |
| 2005/0206647 | A1 * | 9/2005 | Xu et al. | 345/536 |
| 2005/0225554 | A1 * | 10/2005 | Bastos et al. | 345/506 |
| 2005/0237337 | A1 * | 10/2005 | Leather et al. | 345/582 |
| 2005/0251358 | A1 * | 11/2005 | Van Dyke et al. | 702/117 |
| 2005/0251761 | A1 * | 11/2005 | Diamond et al. | 716/1 |
| 2005/0253862 | A1 * | 11/2005 | Hutchins et al. | 345/582 |
| 2005/0261863 | A1 * | 11/2005 | Van Dyke et al. | 702/123 |
| 2006/0020831 | A1 | 1/2006 | Golla et al. | |
| 2006/0033735 | A1 * | 2/2006 | Seiler et al. | 345/421 |
| 2006/0053188 | A1 * | 3/2006 | Mantor et al. | 708/490 |
| 2006/0125825 | A1 * | 6/2006 | Law et al. | 345/426 |
| 2006/0209065 | A1 | 9/2006 | Lapidous et al. | |

OTHER PUBLICATIONS

Montrym, J.; Moreton, H.; "The GeForce 6800," IEEE Micro, vol. 25, Issue 2, pp. 41-51, Mar.-Apr. 2005.*

Doggett, M., Nov. 2005, "ATI Xenos: XBox360 GPU", Eurographics 2005 Slides, 36 pages.*

Ned Greene, Aug. 4-9, 1996, "Hierarchical polygon tiling with coverage masks", Proceedings of the 23rd annual conference on Computer graphics and interactive techniques, (SIGGRAPH '96), ACM, New York, NY, USA, pp. 65-74.*

Mitchell, J.L., "Radeon 9700 Shading", State of the Art in Hardware Shading Course Notes, Chapter 3.1, SIGGRAPH, Jul. 21-26, 2002, 39 pages.*

Victor Moya et al., "A Single (Unified) Shader GPU Microarchitecture for Embedded Systems", High Performance Embedded Architectures and Compilers, Lecture Notes in Computer Science, vol. 3793, Nov. 2005, pp. 286-301.*

Victor Moya, et al., Nov. 2005, "Shader Performance Analysis on a Modern GPU Architecture", Proceedings of the 38th annual IEEE/ACM International Symposium on Microarchitecture (MICRO 38), IEEE Computer Society, Washington, DC, USA, pp. 1-10.*

Feng Xie and Michael Shantz, Jul. 1999, "Adaptive hierarchical visibility in a tiled architecture", Proceedings of the ACM SIGGRAPH/EUROGRAPHICS workshop on Graphics hardware, (HWWS '99), ACM, New York, NY, USA, pp. 75-84.*

Kurt Akeley, Aug. 2-6, 1993, "Reality Engine graphics", Proceedings of the 20th annual conference on Computer graphics and interactive techniques (SIGGRAPH '93), ACM, New York, NY, USA, pp. 109-116.* del Barrio, V.M.; et al., "ATTILA: a cycle-level execution-driven simulator for modern GPU architectures", 2006 IEEE International Symposium on Performance Analysis of Systems and Software, pp. 231-241, Mar. 19-21, 2006.*

Eldridge et al., "Pomegranate: A Fully Scalable Graphics Architecture", Proceedings of the 27th annual conference on Computer graphics and interactive techniques, SIGGRAPH 2000, Jul. 23-28, 2000, pp. 443-454.*

Kil-Whan Lee, et al., "A pixel cache architecture with selective placement scheme based on z-test result", Media System Laboratory, Department of Computer Science, College of Engineering, Yonsei University, 134 Shinchon-Dong, Sudaemoon-Ku, Seoul 120-749, South Korea, Available online Aug. 13, 2004, pp. 41-46.*

Kilgraiff, Emmett; Fernando, Randima, "GPU Gems 2," Chapter 30, NVIDIA Corp., 2nd printing Apr. 2005, 20 pages, retrieved from: http://http.developer.nvidia.com/GPUGems2/gpugems2_chapter30.html.*

Mark, William R., et al., Real-Time 3D Graphics Architecture, Proceedings of the 37th Annual International Symposium on Microarchitecture, MICRO-37 Conference Tutorial Dec. 4, 2004, 88 slides.*

Joel McCormack, et al., 1998, "Neon: a single-chip 3D workstation graphics accelerator", Proceedings of the ACM SIGGRAPH/EUROGRAPHICS workshop on Graphics hardware (HWWS '98), Stephen N. Spencer (Ed.), ACM, New York, NY, USA, pp. 123-132.*

David Blythe, Jul. 2006, "The Direct3D 10 system", ACM SIGGRAPH 2006 Papers (SIGGRAPH '06), ACM, New York, NY, USA, 724-734.*

Pedro V. Sander, Natalya Tatarchuk and Jason L. Mitchell, "Explicit Early-Z Culling for Efficient Fluid Flow Simulation and Rendering," ATI Technical Report-chapter10, Aug. 2004, 12 pages.

Pedro V. Sander, John Isidoro, "Explicit Early Z-Culling and Dynamic Flow Control on Graphics Hardware" Proceeding of the 32 Annual Conference on Computer Graphics and interactive Techniques, SIGGRAPH '05, Jul. 31-Aug. 4, 2005, 42 slides.

Office Action, U.S. Appl. No. 11/934,042 dated Dec. 10, 2010.

Office Action, U.S. Appl. No. 11/934,051 dated Jan. 21, 2011.

Office Action, U.S. Appl. No. 11/934,042 dated May 24, 2011.

Office Action, U.S. Appl. No. 11/934,051 dated Jul. 1, 2011.

\* cited by examiner

EARLY Z TESTING FOR MULTIPLE RENDER TARGETS

CROSS-REFERENCE TO RELATED APPLICATIONS

This application claims benefit of U.S. provisional patent application Ser. No. 60/864,289, filed Nov. 3, 2006, which is herein incorporated by reference.

BACKGROUND OF THE INVENTION

1. Field of the Invention

One or more aspects of the invention generally relate to computer graphics, and more particularly to performing z raster operation computations for multiple render targets.

2. Description of the Related Art

A conventional graphics rendering engine commonly consists of a set of specialized processing engines organized in a dataflow-style pipeline. A setup engine is commonly at the top of the graphics rendering engine. The setup engine operates on geometric primitives, such as triangles, and emits transformed or simplified representations of the geometric primitives to a raster engine. The raster engine determines pixel coverage associated with each geometric primitive, producing a sequential stream of unshaded pixel primitives with an associated depth value (z value). A shader engine operates on the sequential stream of unshaded pixels from the raster engine, producing a stream of shaded pixels. In addition to computing the color of a given pixel, some shader engines optionally generate or modify the z value of a pixel. A raster operations (ROP) unit determines if a new pixel should be saved or discarded through an operation called z testing. Z testing compares a new pixel's depth and stencil data against previously stored depth and stencil data in a render target, i.e., the current depth buffer, at the location of the new pixel. If a pixel survives z testing, the ROP unit optionally writes the new pixel's depth and stencil data to the current depth buffer. The ROP unit also updates and writes the new pixel's color data to another render target, i.e., the current color buffer. When multiple render targets (color buffers) are used, per-pixel z values may be computed and tested for each of the render targets, even when the z values are the same for the multiple render targets. Therefore, techniques are needed to improve z testing efficiency when multiple render targets are used that share a common z buffer.

Additionally, the precise sequence of processing steps in a graphics rendering pipeline is commonly designed to accommodate sequential data dependence in the rendering process. For example, a triangle primitive should be rasterized into a pixel primitive before pixel operations are conducted on the set of pixels covered by the triangle. Additionally, a pixel's z value should be computed before being compared to previously computed z values in the depth buffer. Z testing is commonly conducted after shading, giving the shader engine an opportunity to conclude any depth or stencil computations prior to z testing.

As is well known, the shader engine is the most expensive element of the graphics rendering pipeline, consuming the most logic resources and the most power. Furthermore, complex shading algorithms commonly executed in the shader engine often cause the shader engine to become the leading performance bottleneck in the graphics rendering pipeline. Early z culling in the raster engine achieves some performance gain by discarding primitives known to be occluded before work related to these primitives is triggered within the shader engine. However, early z culling is only a trivial discard mechanism and not a substitute for the more precise z testing. Even when early z culling is employed, the z testing step may discard half or more of the pixels processed by the shader engine. More importantly, the shader engine typically does not even modify the z values of many of the discarded pixels during shading operations, making the traversal of these pixels through the shader engine superfluous. Thus, a consequence of standard architectures is that the shader engine, the single most expensive resource in a graphics rendering pipeline, performs significant work that is then discarded.

As the foregoing illustrates, what is needed in the art is a technique for associating z testing results with multiple sets of color data, using hardware that can be deployed with or without early z culling.

SUMMARY OF THE INVENTION

The current invention involves new systems and methods for computing per-sample post-z test coverage using precise z testing before or after shading operations in a graphics rendering pipeline. The current invention also involves new systems and methods for reusing z test results for one render target when multiple render targets are used, rather than computing the z test results for each of the render targets. These new systems and methods increase the processing efficiency of the graphics rendering pipeline relative to prior art architectures.

The graphics rendering pipeline includes a configuration unit configured to determine whether processing should proceed in early z mode or late z mode, a raster engine configured to receive a geometry primitive from the configuration unit and convert the geometry primitive into one or more pixel primitives that intersect pixel tiles, a shader engine configured to perform shading operations on one or more samples associated with a pixel tile, a z raster operations (ZROP) unit configured to perform z testing on each of the samples, and a pre-raster operations (PROP) unit configured to modify a data flow path between the shader engine and the ZROP unit to support both early z mode and late z mode and reconcile the z test results to produce post-z test pixel tile coverage data. Samples associated with the pixel tile are processed first by the ZROP unit and then by the shader engine when the graphics rendering pipeline is configured for early z mode, and samples are processed first by the shader engine and then by the ZROP unit when the graphics rendering pipeline is configured for late z mode.

Per-sample z values are computed and z tested to produce z pass coverage masks based on the current z buffer that are independent of any color buffers. When multiple render targets are used, z pass coverage masks are copied for each one of the additional color buffers. The copying may be used with either early or late z testing to improve z testing efficiency and graphics rendering performance.

The memory used to store the depth and color data for a render target is divided into multiple partitions, with a ZROP unit dedicated to each one of the multiple partitions for performing z testing. Therefore, z testing for each pixel tile is routed to a particular ZROP unit that corresponds to the partition storing the depth data for that pixel tile. Unlike the ZROP units, the shader engines are not dedicated to particular partitions. Therefore, the number of shader engines is independent of the number of ZROP units and pixel tiles may be shaded by any one of the shader engines. A PROP unit is used to match z pass data provided by the ZROP unit with shaded or rasterized pixel tiles for the shader engines. Once the z pass data is matched with the shaded or rasterized pixel tiles, the PROP unit computes the reconciled coverage data for each pixel tile that indicates which samples in the pixel tile passed the z testing and are within the primitive.

Various embodiments of a method of the invention for performing early z testing for multiple render targets include receiving reconciled pixel tile data for multiple render targets that includes post-z test coverage masks indicating covered samples within pixel tiles, wherein the covered samples are within a graphics primitive and passed the early z testing, shading a portion of the pixel tile data to produce shaded color values for each of the covered samples within the pixel tiles, determining that the multiple render targets are specified, and copying the post-z test coverage masks for each one of the multiple render targets to produce additional post-z test coverage masks.

Various embodiments of the invention include a system for early z testing for multiple render targets. The system includes a replay first-in first-out (FIFO) memory and a shader engine. The replay FIFO memory is configured to store post-z test coverage masks corresponding to pixel tiles for one of the multiple render targets and reload the post-z test coverage masks to copy the post-z test coverage masks for the multiple render targets, wherein the post-z test coverage masks indicate covered samples of the pixel tiles that are within a graphics primitive and passed the early z testing. The shader engine is configured to shade the pixel tiles to produce shaded color values for each of the covered samples within the pixel tiles and merge the shaded color values with the post-z test coverage masks and copied post-z test coverage masks to produce shaded pixel tiles for the multiple render targets.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

The current invention involves new systems and methods for computing per-sample post-z test coverage when the memory is organized in multiple partitions. The shading processing capability can be configured independent of the number of memory partitions, i.e. independent of the memory bandwidth. The number of z raster operations units may be different than the number of shader engines, so that performance for the various types of processing can be scaled independently.

The mapping of (x,y) pixel positions in a render target to the multiple partitions may be changed without idling the graphics processing pipeline by linking each pixel tile being processed with a partition identifier. Each pixel tile maps to exactly one partition associated with a unique partition identifier. The partition identifier is determined by a memory management unit and accompanies the pixel tile through the graphics processing pipeline to control routing of the pixel tile to the proper partition. A multi-threaded FIFO is used to decouple the shader processing from the backend processing. The multi-threaded FIFO stores z pass data produced by the ZROP units in separate queues according to the partition identifiers and the z pass data is matched to pixel tile data to produce per-sample coverage data. The pixel tile data may include shaded colors when a late z testing mode is used and tile descriptors (including x,y position and the coverage data) when an early z testing mode is used. Rendering performance may be improved by shading when an early z testing mode is used to eliminate non-visible samples before shading. The number of shader engines does not need to match the number of ZROP units, allowing for shading and hidden surface removal performance to be scaled independently. Furthermore, when the number of memory partitions is reduced to reduce system costs, the shading processing capability is not necessarily reduced since the shading engines are not dedicated to a particular partition. The shading processing capability can be configured independent of the number of memory partitions.

Figure 1:
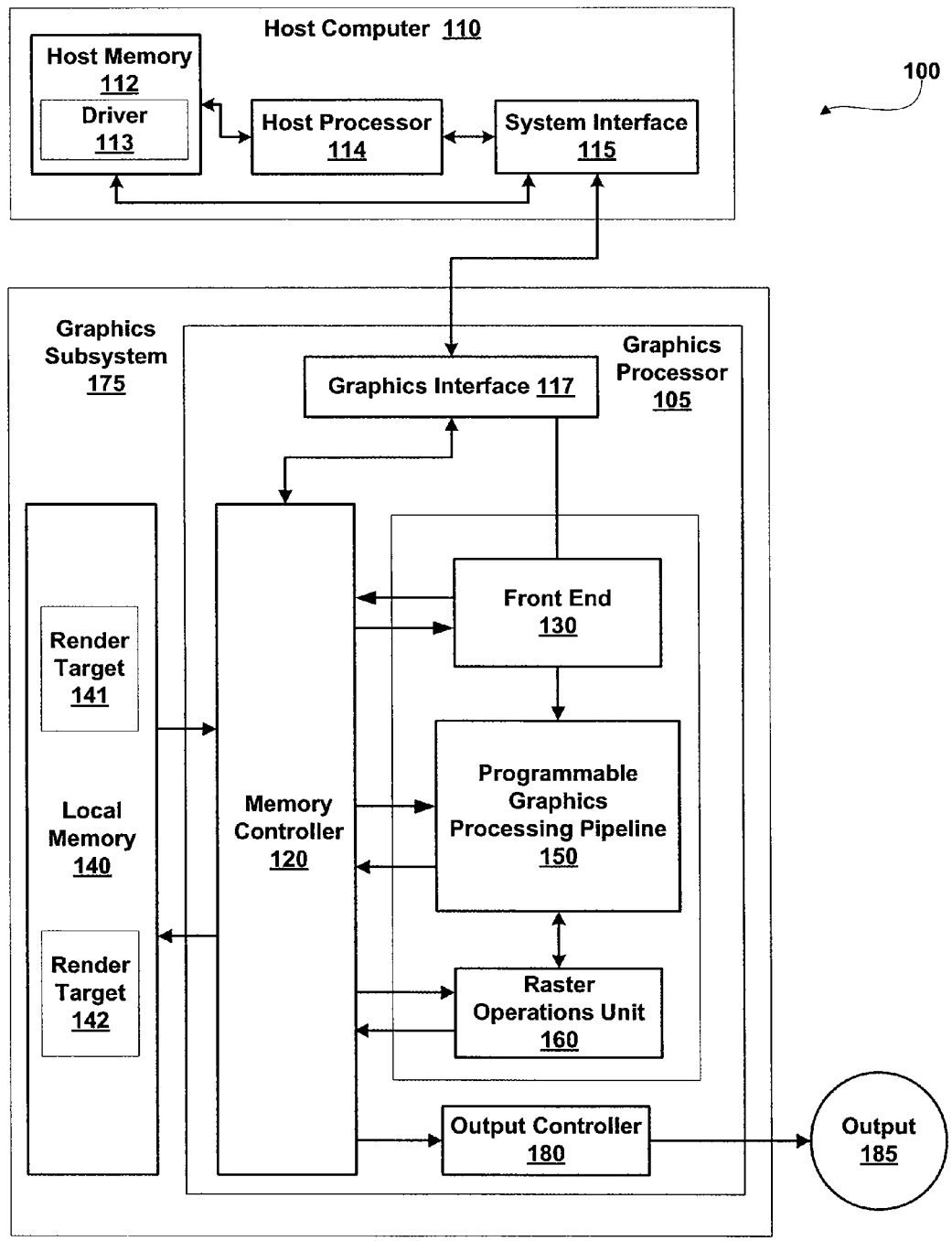
FIG. 1 is a block diagram of an exemplary embodiment of a respective computer system in accordance with one or more aspects of the present invention including a host computer and a graphics subsystem.

FIG. 1 illustrates a computing system generally designated 100 including a host computer 110 and a graphics subsystem 175 in accordance with one or more aspects of the present invention. Computing system 100 may be a desktop computer, server, laptop computer, personal digital assistant (PDA), palm-sized computer, tablet computer, game console, cellular telephone, computer based simulator, or the like. Host computer 110 includes host processor 114 that may include a system memory controller to interface directly to host memory 112 or may communicate with host memory 112 through a system interface 115. System interface 115 may be an I/O (input/output) interface or a bridge device including the system memory controller to interface directly to host memory 112.

A graphics device driver, driver 113, interfaces between processes executed by host processor 114, such as application programs, and a programmable graphics processor 105, translating program instructions as needed for execution by graphics processor 105. Driver 113 also uses commands to configure sub-units within graphics processor 105. Specifically, in some embodiments of the present invention, driver 113 may configure a graphics processor 105 to operate in an early z mode or a late z mode. In other embodiments of the present invention, graphics processor 105 determines the configuration based on state information provided by driver 113. When operating in an early z mode, z testing is performed by raster operations unit 160 before the pixel tiles are shaded, so that only the visible pixels are shaded. When operating in a late z mode, z testing is performed by raster operations unit 160 after the pixel tiles are shaded, as required when depth values may be modified during shading.

Host computer 110 communicates with graphics subsystem 175 via system interface 115 and a graphics interface 117 within a graphics processor 105. Data received at graphics interface 117 can be passed to a front end 130 or written to a local memory 140 through memory controller 120. Graphics processor 105 uses graphics memory to store graphics data and program instructions, where graphics data is any data that is input to or output from components within the graphics processor. Graphics memory can include portions of host memory 112, local memory 140, register files coupled to the components within graphics processor 105, and the like. Graphics data that is produced by graphics processor 105 and stored in graphics memory as a render target, such as render target 141 and render target 142. Render targets 141 and 142 include depth buffers, image buffers, texture maps, or the like.

Graphics processor 105 includes, among other components, front end 130 that receives commands from host computer 110 via graphics interface 117. Front end 130 interprets and formats the commands and outputs the formatted commands and data to a programmable graphics processing pipeline 150. Some of the formatted commands are used by programmable graphics processing pipeline 150 to initiate processing of data by providing the location of program instructions or graphics data stored in memory. Front end 130, programmable graphics processing pipeline 150 and a raster operations unit 160 each include an interface to memory controller 120 through which program instructions and data can be read from memory, e.g., any combination of local memory 140 and host memory 112.

Front end 130 optionally reads processed data, e.g., data written by raster operations unit 160 and stored in a render target, from memory and outputs the data, processed data and formatted commands to programmable graphics processing pipeline 150. Programmable graphics processing pipeline 150 may include several multithreaded processing units. A multithreaded processing unit may receive first geometry, such as higher-order surface data, and tessellate the first geometry to generate second geometry, such as vertices. A multithreaded processing unit may be configured to transform the second geometry from an object-based coordinate representation (object space) to an alternatively based coordinate system such as world space or normalized device coordinates (NDC) space. Each multithreaded processing unit may include a read interface to read program instructions and graphics data such as texture maps from local memory 140 or host memory 112 via memory controller 120.

The multithreaded processing units and raster operations unit 160 each contain one or more programmable processing units to perform a variety of specialized functions. Some of these functions are table lookup, scalar and vector addition, multiplication, division, coordinate-system mapping, calculation of vector normals, tessellation, calculation of derivatives, anisotropic texture filtering, interpolation, compression, decompression, and the like. The multithreaded processing units and raster operations unit 160 are each optionally configured such that data processing operations are performed in multiple passes through those units or in multiple passes within programmable graphics processing pipeline 150. Raster operations unit 160 also includes a write interface to memory controller 120 through which data can be written to memory.

In a typical implementation, programmable graphics processing pipeline 150 performs geometry computations, rasterization, and pixel computations. Therefore, the multithreaded processing units are programmed to operate on surface, primitive, vertex, fragment, pixel, sample or any other data. For simplicity, the remainder of this description will use the term "samples" to refer to graphics data such as pixels, fragments, sub-pixel samples, or the like, and the term "geometry" to refer to graphics data such as surfaces, primitives, vertices, or the like. At least one set of geometry is output by front end 130 and received by programmable graphics processing pipeline 150. A set of samples or geometry is processed according to at least one program, e.g., primitive, vertex, or shader program. A program can process one or more sets of samples or geometry. Conversely, a set of samples or geometry can be processed by a sequence of one or more programs.

Samples output by programmable graphics processing pipeline 150 are passed to raster operations unit 160, which optionally performs near and far plane clipping and raster operations, such as stencil, z test, and the like, and saves the results or the samples output by programmable graphics processing pipeline 150 in a render target, e.g., render target 141, render target 142, or the like in graphics memory. When the data received by graphics subsystem 175 has been completely processed by graphics processor 105, an output 185 of graphics subsystem 175 is provided using an output controller 180. Output controller 180 is optionally configured to deliver data to a display device, network, electronic control system, other computing system 100, other graphics subsystem 175, or the like. Alternatively, data is output to a film recording device or written to a peripheral device, e.g., disk drive, tape, compact disk, or the like.

Figure 2:
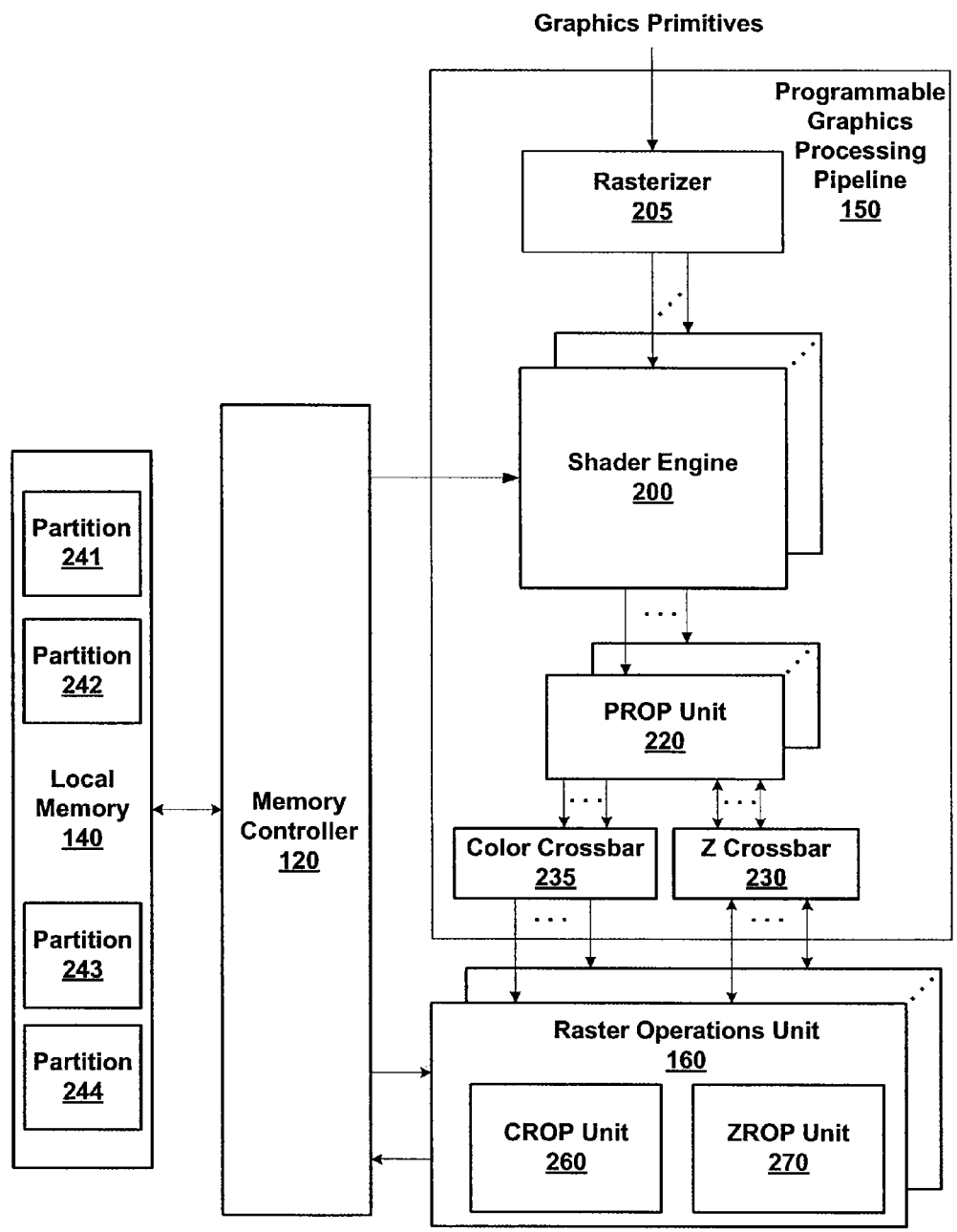
FIG. 2 is a block diagram of a portion of the graphics subsystem of FIG. 1 in accordance with one or more aspects of the present invention.

FIG. 2 is a block diagram of a portion of the graphics subsystem 175 of FIG. 1, in accordance with one or more aspects of the present invention. In this embodiment of the present invention, programmable graphics processing pipeline 150 is configured to perform z testing in a late z mode, meaning that samples are shaded before hidden surface removal is performed by raster operations unit 160. Therefore, shaded sample data is output by programmable graphics processing pipeline 150 to raster operations unit 160. In other embodiments of the present invention, programmable graphics processing pipeline 150 may be configured to perform z testing in either a late z mode or in an early z mode, as described in conjunction with FIGS. 5A, 5B, and 5C.

Graphics primitives may be assembled from vertices and then rasterized to produce fragments for pixels, including coverage information. Rasterizer 205 outputs pixel tiles and rasterized coverage for each pixel tile. The multisample mode specifies the number of sub-pixel samples used to represent each pixel and the sub-pixel sample positions. The pixel format specifies the number of bits used to represent each sample attribute, e.g., depth, color, and the like.

Programmable graphics processing pipeline 150 includes one or more multithreaded processing units, represented as shader engines 200 that may be configured to execute primitive, vertex, or shader programs. Program instructions configure shader engines 200 to perform operations such as tessellation, perspective correction, texture mapping, shading, blending, and the like, to produce processed samples or geometry. The processed samples are output from programmable graphics processing pipeline to raster operations unit 160.

Rasterizer 205 receives plane equation coefficients, typically produced by a triangle setup unit, for a primitive defining one or more attributes, e.g., texture coordinates, color components, and z. For example, z plane equation coefficients, A, B, and C may be used to compute a z value at any position (x,y) within the primitive by evaluating the plane equation:

$$Z \text{ value} = Ax + By + C.$$

Likewise, plane equation coefficients for other attributes, e.g. color components red, green, blue, alpha, and the like, may be used to compute values of the other attributes associated with the primitive.

Rasterizer 205 is a sampling unit that processes graphics primitives and generates sub-primitive data, such as pixel data or fragment data, including rasterized coverage data. Rasterized coverage data indicates which sample positions within a pixel tile are "covered" by a fragment formed by the intersection of the pixel tile and a primitive, where a pixel tile is a region of pixels or sample positions in screen space. Graphics primitives include geometry, such as points, lines, triangles, quadrilaterals, meshes, surfaces, and the like. Rasterizer 205 converts graphics primitives into sub-primitive fragment data, performing scan conversion on the graphics primitives. Rasterizer 205 uses a set of fixed or programmed sample positions, the set may be specified by the multisample mode provided by driver 113. A single sample position or multiple sample positions for each pixel may be included in the set. Rasterizer 205 outputs fragment data to a shader engine 200 for execution of a shader program.

Rasterizer 205 outputs fragment data for each pixel tile, e.g., z plane equation data, plane equation data for color components and texture coordinates, a screen space position (x,y), and rasterized coverage mask, to a shader engine 200. A shader engine 200 computes and processes color values for one or more sample positions using the fragment data for each pixel tile and techniques known to those skilled in the art. The shader engine 200 may also compute z values for one or more sample positions using the plane equation data provided by rasterizer 205. Alternatively, the shader engine 200 may compute z values without using the plane equation data provided by rasterizer 205, or the shader engine 200 may not compute z values for the pixel tile.

Figure 3:
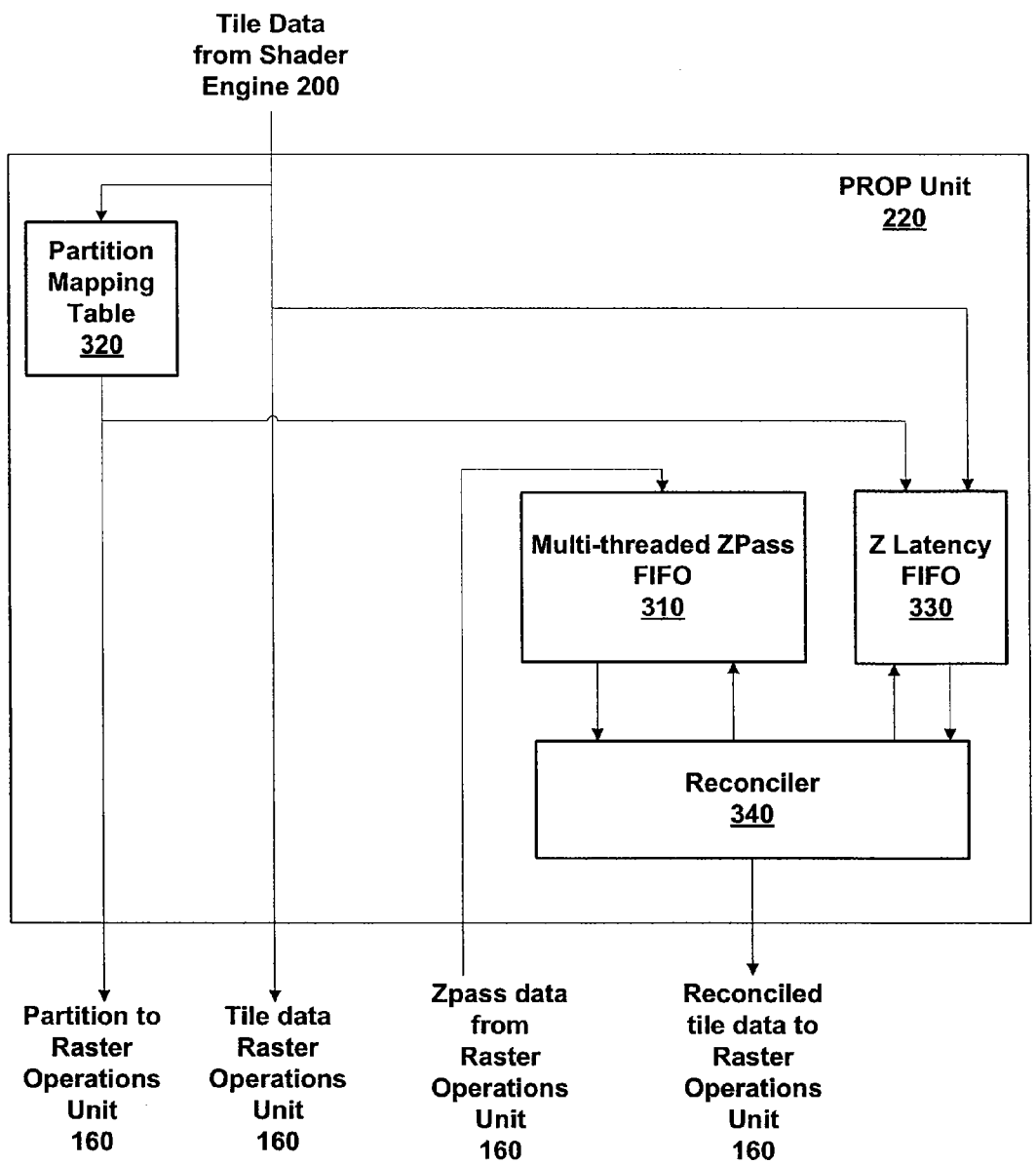
FIG. 3 is a block diagram of the PROP unit of FIG. 2 in accordance with one or more aspects of the present invention.

Each shader engine 200 is coupled to a PROP unit 220 that receives the shaded pixel tiles and matches the shaded pixel tiles with z pass data received from a ZROP unit 270 within raster operations unit 160 for each pixel tile, as described in conjunction with FIG. 3. PROP unit 220 computes a post-z test coverage mask for each pixel tile and outputs the shaded pixel tiles, including the post-z test coverage masks to raster operations unit 160. A CROP unit 260 within raster operations unit 160 writes, as determined by the results of the post-z test coverage masks, each passing sample's color value to a render target.

When necessary, ZROP unit 270 determines z values for each sample position using sample positions specified by the multisample mode and plane equation data provided by rasterizer 205. ZROP unit 270 may also be configured to perform decompression, compression, and hidden surface removal, i.e., z testing. ZROP unit 270 compares z values for the current samples to previously stored z values for the corresponding sample positions. The results from ZROP 270, represented as a z pass mask, indicate whether the various samples are to be kept or discarded. More specifically, the ZROP unit 270 compares each current sample's z value with the z value of the corresponding sample position previously stored in a depth buffer, such as render target 141 or 142, to perform a process conventionally known as "z testing" or "hidden surface removal." ZROP unit 270 provides the z pass mask for each pixel tile to the particular PROP unit 220 that stores the corresponding pixel tile via a Z crossbar 230. ZROP unit 270 optionally writes the z values of samples that pass the z test to the depth buffer. Samples that do not pass the z test are discarded by PROP unit 220, and ZROP unit 270 does not write any z values for those discarded samples. As persons skilled in the art understand, in addition to z values determining the visibility of a pixel, stencil values optionally may be used in conjunction with z values in making a final determination of whether a particular pixel passes or fails z testing. Therefore, any reference herein to z values has applicability, where appropriate, to stencil values.

Local memory 140 is constructed of one or more memory devices, such as dynamic random access memory (DRAM) devices. The number of raster operations units 160 equals the number of memory partitions, partitions 241, 242, 243, and 244. An advantage of having an equal number of raster operations units 160 and memory partitions is that the processing throughput of each raster operations unit 160 can be matched with the bandwidth of a single memory partition and the number of raster operations units 160 can be scaled based on a particular memory configuration. Each raster operations unit 160 is dedicated to a particular memory partition and each pixel tile output by PROP unit 220 includes a memory partition identifier that is used by Z crossbar 230 and C crossbar 235 to route the pixel tile to the corresponding raster operations unit 160 for processing by ZROP unit 270 and CROP unit 260, respectively. Note that a color tile and a corresponding z the that map to the same pixel tile are not necessarily stored in the same partition. Furthermore, when multiple color render targets are used, each render target may have a different partition mapping. Therefore, the pixel tile position and a render target identifier are used to read a partition mapping table that stores the partition identifiers for each pixel tile. Z crossbar 230 is also used to return z pass data from a ZROP unit 270 to the PROP unit 200 that stores the pixel tile corresponding to the z pass data. Z crossbar 230 performs cross-mapping between the PROP units 200 and ZROP unit 270 since the PROP unit 200 and ZROP units 270 are decoupled. Each PROP unit 200 may process data for any memory partition, whereas each ZROP unit 270 is associated with a particular memory partition.

While a shader engine 200 can process a pixel tile to produce shaded sample data according to a shader program, the z pass data for the pixel tile is processed by the ZROP unit 270 dedicated to the memory partition that the pixel tile is mapped to. PROP unit 220, Z crossbar 230, and color crossbar 235 enable N number of shader engines 200 to be used to process graphics data for M memory partitions by routing pixel tile data between the N shader engines 200 via PROP unit 220 and M raster operation units 160. Shading performance and memory bandwidth for each graphics processing system may be scaled independently, allowing for a variety of graphics processing products with different performance capabilities. Furthermore, when a manufacturing defect prevents a particular memory partition from functioning properly that memory partition and corresponding raster operations unit 160 may be disabled without disabling any shader engines 200. Similarly, a memory partition may not be populated for a particular system to reduce system cost while enabling all of the shader engines 200 for graphics processing.

FIG. 3 is a block diagram of PROP unit 220 of FIG. 2, in accordance with one or more aspects of the present invention. PROP unit 220 is configured to pass a first portion of the data in shaded pixel tiles received from shader engine 200 to a raster operations unit 160. The first portion includes the z parameters needed to compute z values for each sample in the pixel tile. In some embodiments of the present invention, the parameters may be plane equation coefficients and in other embodiments of the present invention, the parameters may reference the plane equation coefficients need to compute per-sample z values. Alternatively, the parameters are the z values. In some embodiments of the present invention, the z parameters bypass shader engine 200 and are stored in a latency FIFO in PROP unit 220 for output to raster operations unit 160. The pixel tile position is input to a partition mapping table 320 that outputs the partition identifier that the pixel tile position is mapped to for each render target, e.g., z buffer and color buffer. The partition identifier is output to raster operations unit 160 and is stored in a z latency FIFO 330 with a second portion of the data in shaded pixel tiles as data packets. The second portion of the data includes shaded color values for each sample in the pixel tile, the rasterized coverage for the pixel tile, and the pixel tile position. Z latency FIFO 330 is used to store data packets for pixel tiles while the z testing is performed by ZROP unit 270.

A shaded pixel tile may be divided into multiple data packets for a single shaded pixel tile. The number of data packets that the shaded pixel data for a pixel tile is divided into is based on the multisample mode and the number of bits used to represent each sample. For example, when the number of bits used to represent each sample is 32 bits, four samples are stored in a 128 bit entry of z latency FIFO 330 and a 4×4 sample pixel tile is divided into a sequence of four packets. Alternatively, an 8×4 sample tile may contain eight 32 byte×4 packets.

Each data packet includes shaded color data for a portion of the samples in the pixel tile, a corresponding portion of the rasterized coverage mask, the z buffer and color buffer partition identifiers for the pixel tile, the pixel tile position, and an end of coverage packet flag "eozp" flag. Data packets are stored in a sequence of entries of z latency FIFO 330. The eozp flag is asserted when the data packet is the last data packet for the pixel tile and it is used to synchronize the color data stream with the z pass data stored for the pixel tile in a multi-threaded z pass FIFO 310, as described in conjunction with FIG. 4.

Graphics processor 105 is configured to support context switching that allows for execution to be switched from one shader program to another. This feature ensures that programmable graphics processing pipeline 150 cannot be monopolized by any one shader program. During a context switch, the states of programmable graphics processing pipeline 150 of the currently executing shader program are stored in memory, and programmable graphics processing pipeline 150 is switched to states of another shader program that was previously stored in memory.

During context switching the pixel tile position to physical memory mapping information may be changed and it is advantageous to not have to idle shader engines 200, PROP units 220, and raster operations units 160 in order to perform the context switch. A partition mapping table 320 within PROP unit 220 stores information necessary to determine which memory partition a pixel tile is stored in, based on the pixel tile screen space position or a virtual or physical address corresponding to the screen space position. When a context switch is performed entries in partition mapping table 320 may be changed by driver 113. Even though a new tile mapping may be stored in partition mapping table 320 after a context switch, the sequencing and popping of z pass FIFO 310 may continue since the partition identifiers are pipelined with the z pass data. However, when virtual addressing is used, then virtual to physical memory mapping may have changed during the context switch, so pixel data previously assigned to one partition may not be mapped to that same partition. In that case, all in-flight data sent to ZROP unit 270 must complete processing (drain) and be reconciled with the data stored in a multi-threaded z pass FIFO 310. When the in-flight data is processed, the virtual to physical memory mapping may be changed in partition mapping table 320 and processing is resumed using the new context.

PROP unit 220 receives z pass data, including z pass coverage masks for shaded pixel tiles from the particular raster operations unit 160 that performed z testing for shaded pixel tiles received by PROP unit 220. The z pass data is stored in an entry of multi-threaded z pass FIFO 310 based on A ZROP partition identifier is produced by PROP unit 220 and accompanies the z data that is output to z crossbar 230. Z crossbar 230 routes the z data to the proper ZROP unit 270 and sends a PROP partition identifier corresponding to the PROP unit 220 that output the z data with the z data to the proper ZROP unit 270. ZROP unit 270 pipelines the PROP partition identifier received with the z data, e.g., parameters for a pixel tile, as the z pass data is computed in order to route the z pass data to the proper PROP unit 220. Z crossbar 230 routes the z pass data to the proper PROP unit 220 along with a ZROP partition identifier corresponding to the ZROP unit 270 that computed the z pass data to the proper PROP unit 220. Since a single ZROP unit 270 computes all of the z pass coverage masks for a single ZROP partition identifier, the z pass data is returned in the order that it is received for each ZROP partition. However, any PROP unit 220 may process the pixel tiles that are mapped to any partition. Only the ZROP partition identifier is needed to separate the z pass data returned to each PROP unit 220 for synchronization with the shaded pixel tile.

Multi-threaded z pass FIFO 310 is used to collect the z pass data returned from the ZROP units 270 for each ZROP identifier in separate queues. Separate queues are needed since the z pass data associated with different ZROP partition identifiers may be returned from the ZROP units 270 in a different order than the z parameters are output by PROP unit 220. Therefore, the order of the pixel tiles in z latency FIFO 330 would not necessarily match the order of the returned z pass data if a conventional (non-multi-threaded) FIFO were used to store the returned z pass data. Separate queues are used to avoid a deadlock condition that would be caused when early returned z pass data blocks later returned z pass data in a single FIFO. Alternatively, separate conventional FIFOs may be used to store returned z pass data, requiring a FIFO dedicated to each partition. A disadvantage of using separate FIFOs is that when the processing workload is not evenly distributed between the different partitions, some FIFOs may be full while others are empty resulting in a poor distribution of resources that may limit performance. In other words, the number of transactions sent to a ZROP unit 270 cannot exceed the number of slots in the conventional FIFO dedicated to that ZROP unit 270. In order to accommodate the worst case load imbalance between ZROP units 270, each conventional FIFO would need to be sized for the worst case latency.

Multi-threaded z pass FIFO 310 allows for the returned z pass data to be stored in separate queues within a single memory structure. The separate queues appear as separate conventional FIFOs, while permitting a dynamic allocation of the FIFO entries between the different partitions. Therefore, when the processing workload is not evenly distributed between the partitions, the allocation of entries within multi-threaded z pass FIFO 310 may be changed accordingly, resulting in an efficient use of resources even when the processing workloads are not balanced between ZROP units 270. Furthermore, a single multi-threaded FIFO may be smaller in terms of die area compared with two or more separate conventional FIFOs.

A reconciler 340 within PROP unit 220 matches returned z pass coverage masks stored in multi-threaded z pass FIFO 310 with data packets stored in z latency FIFO 330. Reconciler 340 then combines the rasterized coverage for the shaded pixel tile with the z pass mask for the shaded pixel tile to produce a post-z test coverage mask for the shaded pixel tile, discarding any samples that are not covered based on rasterization and z testing. PROP unit 220 outputs the reconciled tile data, e.g., shaded pixel data and post-z test coverage mask, to raster operations unit 160 for processing by a CROP unit 260.

Figure 4:
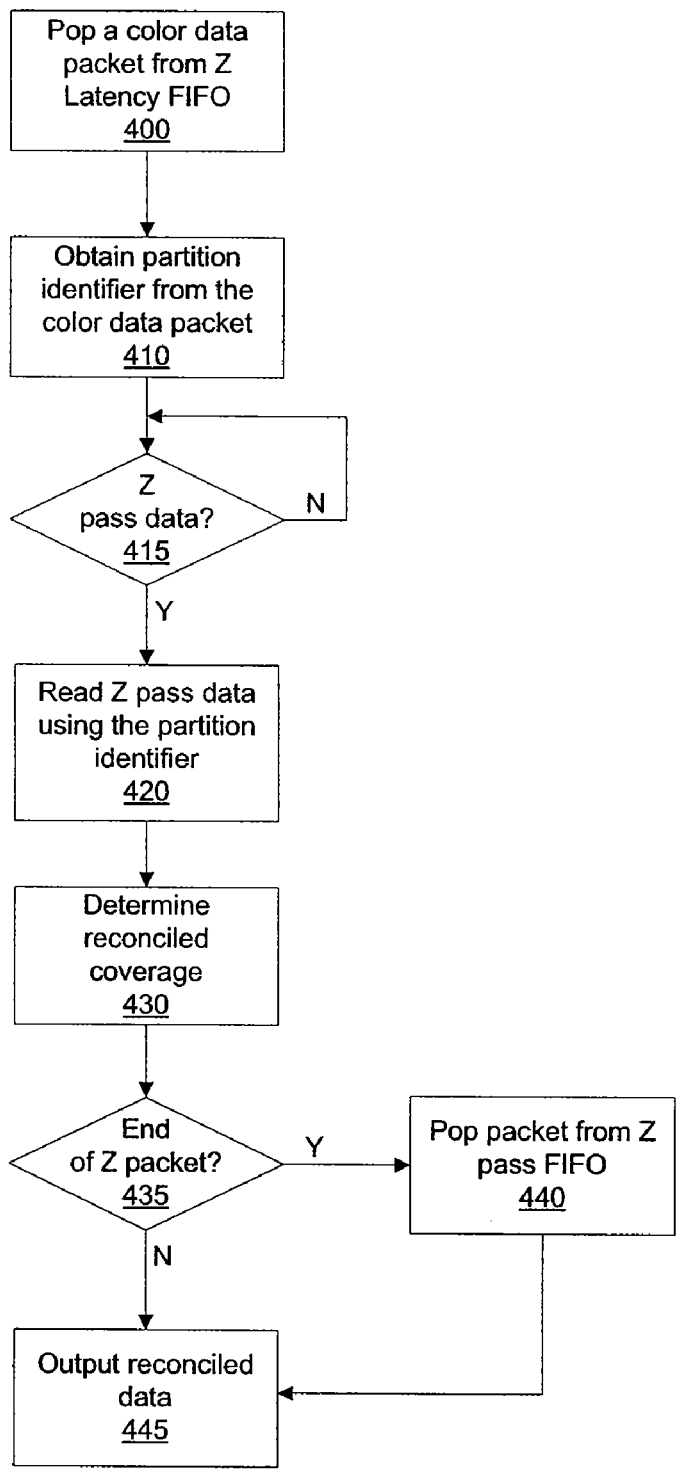
FIG. 4 illustrates an embodiment of a method of processing Z pass data and pixel tile data to produce reconciled coverage data in accordance with one or more aspects of the present invention.

FIG. 4 illustrates an embodiment of a method of processing Z pass data and shaded pixel tile data to produce reconciled tile data, in accordance with one or more aspects of the present invention. In step 400, reconciler 340 pops a data packet from z latency FIFO 330. In step 410, reconciler 340 obtains the ZROP partition identifier from the data packet. In step 415, reconciler 340 determines if a z pass coverage mask is stored in multi-threaded z pass FIFO 310 for the ZROP partition identifier, and, if not, reconciler 340 repeats step 415, waiting for PROP unit 220 to receive a z pass coverage mask from ZROP Unit 270.

When a z pass coverage mask for the partition is available, in step 420 reconciler 340 reads the z pass coverage mask using the ZROP partition identifier, reading the first entry in multi-threaded z pass FIFO 310 queued for the partition. Notably, the first entry is not necessarily popped since each z pass coverage mask may correspond to more than one data packet. Multi-threaded z pass FIFO 310 allows for an entry for any partition to be read without being popped. In step 430 reconciler 340 computes the post-z pass coverage mask for the data packet by performing a bit-wise AND between the portion of the rasterized coverage mask included in the data packet and the corresponding portion of the z pass coverage mask read in step 420.

In step 435, reconciler 340 determines if the eozp flag in the data packet is asserted, and, if not, reconciler 340 proceeds directly to step 445. Otherwise, in step 440 reconciler 340 pops the z pass coverage mask read in step 420 from multi-threaded z pass FIFO 310. The entry in multi-threaded z pass FIFO 310 that stored the popped z pass coverage mask may then be allocated to the same partition or a different partition. In step 445 reconciler 340 outputs the reconciled tile data including the shaded samples in the data packet, the post-z test coverage mask for the data packet, the data packet screen position, and the color buffer partition identifier, to CROP unit 260 in raster operations unit 160. In some embodiments of the present invention, reconciler 340 gathers the reconciled tile data for an entire pixel tile and the reconciled tile data that is output represents an entire pixel tile instead of portions of an entire pixel tile.

In some embodiments of the present invention, programmable graphics processing pipeline 150 is configured to perform early z testing before shading to reduce the shading workload for processing samples that would otherwise be eliminated during late z testing. When complex shaders are used the performance improvement may be significant since the shading throughput will be improved when primitives that will fail the depth test are eliminated prior to shading. In some embodiments of the present invention, PROP unit 220 is configured to interface between shader engine 200 and raster operations unit 160, routing pixel tiles as needed to perform either early z testing or late z testing. A z test mode to control whether early z testing or late z testing is used for a shader program is set by driver 113 or determined based on graphics rendering pipeline state.

Figure 5A:
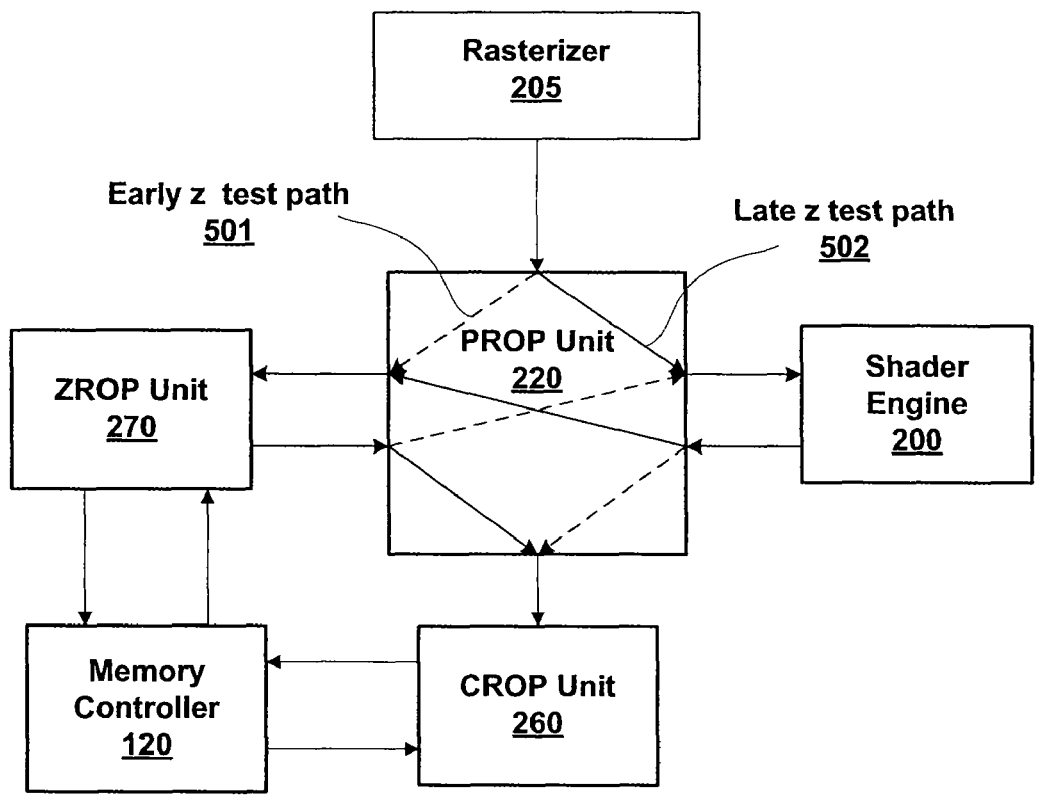
FIG. 5A is a conceptual diagram of data flow through a graphics rendering pipeline in accordance with one or more aspects of the present invention.

FIG. 5A is a conceptual diagram of data flow through a graphics rendering pipeline that supports both early z testing and late z testing, in accordance with one or more aspects of the present invention. Rasterizer 205 computes the coverage of geometric primitives and emits pixel primitives, represented by pixel tiles, for further processing. PROP unit 220 manages the flow of pixel tiles between ZROP unit 270, CROP unit 260 and shader engine 200, sequencing the order of operations in accordance with the current z test mode. A first data flow path, late z test path 502 is shown in solid lines running through PROP unit 220. When late z testing is used, shader engine 200 first operates on a rasterized pixel tile to calculate shaded pixel tile data including, without limitation, color and/or z values for the related samples. PROP unit 220 routes the shaded pixel tiles to ZROP unit 270 for z testing. ZROP unit 270 updates the z values in the depth buffer for all samples passing the z test and returns the z pass coverage mask to reconciler 340 within PROP unit 220, which then discards all samples that do not pass the z test and transmits the surviving samples to CROP unit 260 for any remaining color and render target updates. ZROP unit 270 and CROP unit 260 may each read and write render targets 141 and 142 as needed to perform z testing, stencil operations, and blending.

In many instances, the z values for samples are not computed or altered by shader engine 200. In those instances, z testing may be completed before shading, thereby relieving shader engine 200 from the superfluous work associated with processing samples that (i) have z values that are not altered by shading operations and (ii) are destined to be discarded through z testing. A second data flow path, early z test path 501 is shown in dashed lines running through PROP unit 220. Rasterized pixel tiles produced by rasterizer 205 are routed to ZROP unit 270 via PROP unit 220 for z testing and returned to reconciler 340 within PROP unit 220 before being routed to shader engine 200. Again, using the results of the z test, reconciler 340 discards all samples that do not pass the z test and transmits the surviving samples to shader engine 200 for shading operations. Since shader engine 200 processes only samples that survive z testing, the number of samples processed in early z testing mode may be substantially reduced relative to the number of samples processed in late z testing mode. After shading, PROP unit 220 transmits the shaded pixel tiles to CROP unit 260.

Whether programmable graphics processing pipeline 150 is configured in early z testing mode or in late z testing mode, z testing is generally performed on all samples that have not been killed. As described, in the case of early z testing, shader engine 200 is relieved of the computation associated with samples that are discarded on account of z testing, resulting in improved system performance. In the case of late z testing, shader engine 200 shades all samples regardless of the ultimate disposition of each sample. Late z testing is the general case and accommodates all rendering states available in programmable graphics processing pipeline 150; whereas, the use of early z testing is restricted to certain frequently encountered rendering states and is implemented opportunistically when eligible primitives are to be rendered. A primitive configuration unit (not shown) in front end 130 may determine whether programmable graphics processing pipeline 150 is configured to perform early z testing or late z testing. In other embodiments of the present invention, the functions of the primitive configuration unit are performed by another unit in programmable graphics processing pipeline 150 or locally by each unit or pipeline stage that operates differently depending on the z testing mode. In general, the z testing mode is set as early z if the current rendering state indicates that z values associated with a primitive are not going to be altered by shader engine 200.

Figure 5B:
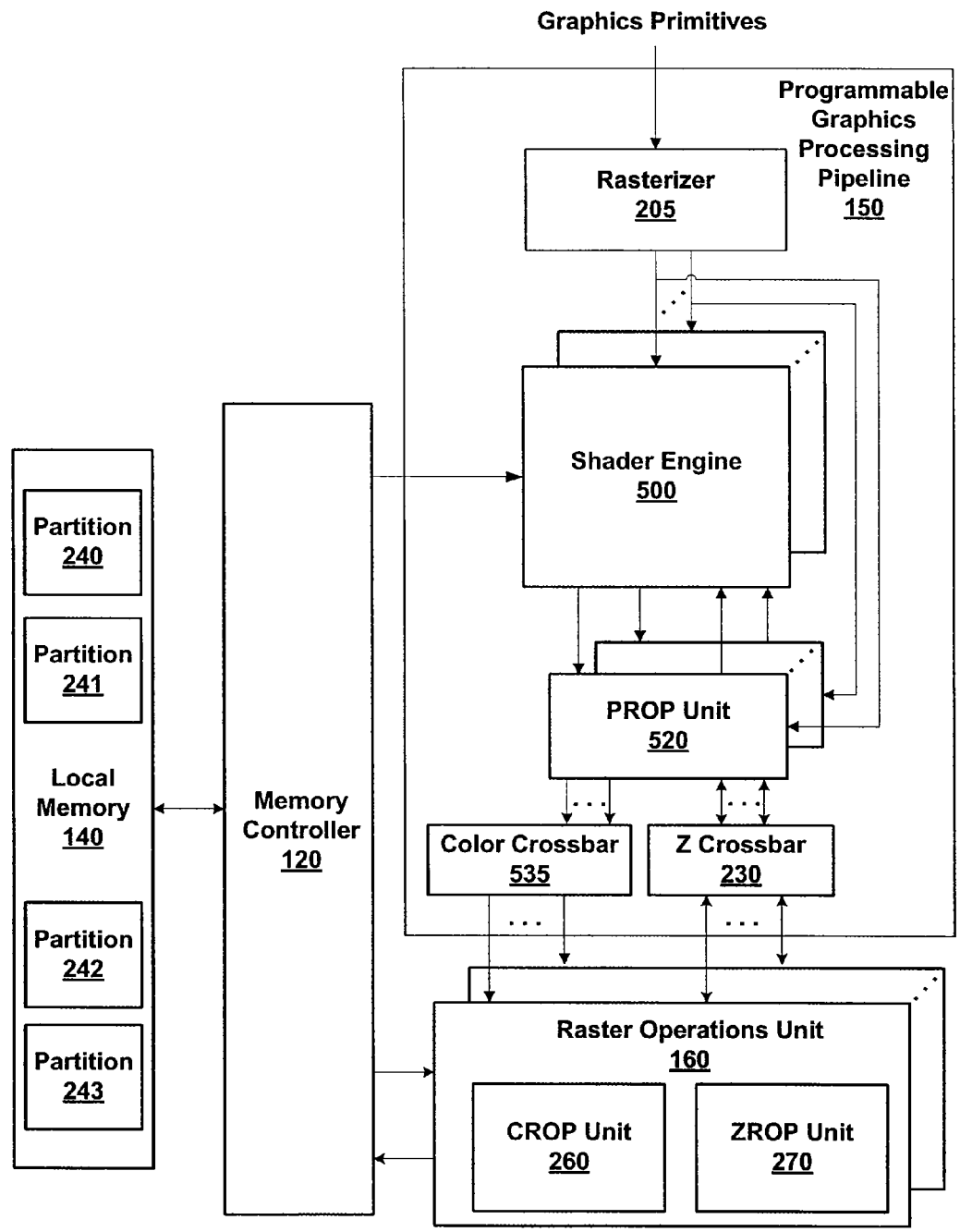
FIG. 5B is another block diagram of the portion of the graphics subsystem of FIG. 1 in accordance with one or more aspects of the present invention.

FIG. 5B is another block diagram of the portion of the graphics subsystem 175 of FIG. 1, in accordance with one or more aspects of the present invention. FIG. 5B includes several of the processing elements shown in FIG. 2, with additional interfaces that are needed for early z testing. A shader engine 500 performs the functions of shader engine 200 and is additionally configured to receive reconciled tile data from PROP unit 520. PROP unit 520 is configured to receive rasterized tile data directly from rasterizer 205 when PROP unit 520 is configured for early z testing. PROP unit 520 is described in detail in conjunction with FIG. 5C. Finally shader engine 500 is also configured to output shaded tile data to color crossbar 535 via PROP unit 520 when early z testing is used. During early z testing, PROP unit 520 is configured to attach the color buffer partition identifier for the color tile with the shaded tile data before outputting the shaded tile data to color crossbar 535. As previously mentioned, the partition identifier for a color tile may differ from the partition identifier of the corresponding z tile that maps to the same pixel tile.

Figure 5C:
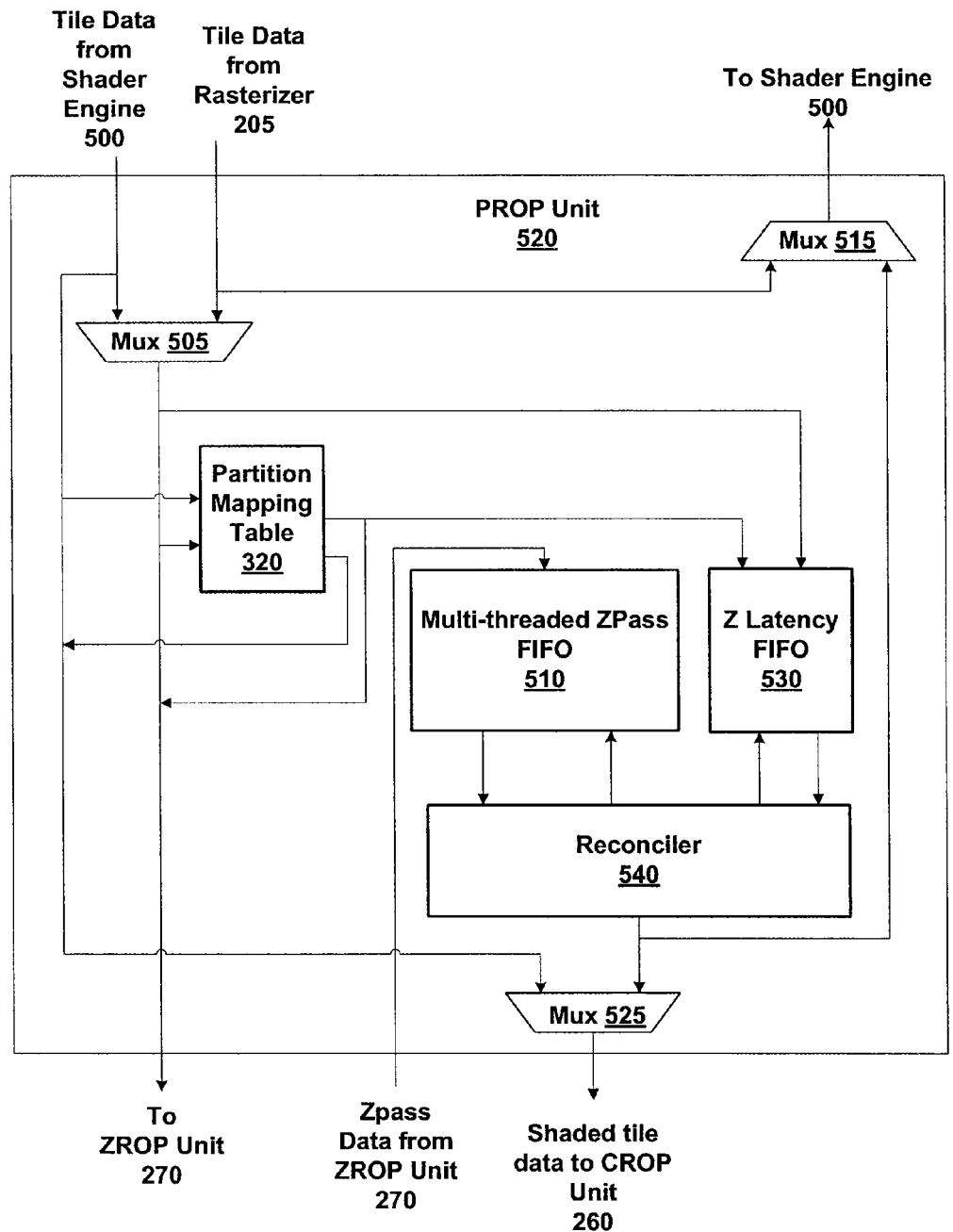
FIG. 5C is a block diagram of the PROP unit of FIG. 5B in accordance with one or more aspects of the present invention.

FIG. 5C is a block diagram of PROP unit 520 of FIG. 5B that is configured based on the z test mode, in accordance with one or more aspects of the present invention. PROP unit 520 includes muxes (multiplexers) 505, 515, and 525 to route data based on the z test mode. Multiplexer 505 selects shaded pixel tiles received from shader 500 for output when the late z test mode is used and selects rasterized pixel tiles received from rasterizer 205 for output when the early z test mode is used. When either z test mode is used, ZROP unit 270 receives z parameters for a pixel tile and a PROP identifier provided by z crossbar 230.

A z latency FIFO 530 performs the function of z latency FIFO 330, but the content of the data packets varies depending on the z test mode. In particular, when early z testing is used the data packets include fragment data, e.g., (x,y), coverage, and the like, instead of the shaded color values that are provided during late z testing. In some embodiments of the present invention, the parameters may be plane equation coefficients and in other embodiments of the present invention, the parameters may reference the plane equation coefficients need to compute per-sample values for the pixel tile.

Multi-threaded z pass FIFO 510 operates in the same manner as multi-threaded z pass FIFO 310, storing z pass coverage masks received from ZROP unit 270. A reconciler 540 performs the same functions as reconciler 340, combining the z pass coverage masks with rasterized coverage masks to produce post-z test coverage masks. The data packets received by reconciler 540 may store shader input parameters or shaded color values. Reconciler 540 outputs data packets storing shader input parameters as reconciled tile data output to shader engine 500 via mux 515 when the early z testing mode is used. When early z testing mode is used mux 525 is configured to output shaded tile data from shader engine 500 to CROP unit 260. When late z testing mode is used, the reconciled tile data produced by reconciler 540 that includes shaded color values, is output to CROP unit 260 via mux 525.

When either z test mode is used, shader engine 500 receives data packets including a pixel tile position, shader input parameters, and a coverage mask from multiplexer 515 PROP unit 520. When early z testing is used the coverage mask may have been modified by reconciler 540 and when late z testing is used the coverage mask is the rasterized coverage mask produced by rasterizer 205. During early z testing reconciler 540 may kill pixel quads (2×2 pixel regions).

Figure 6:
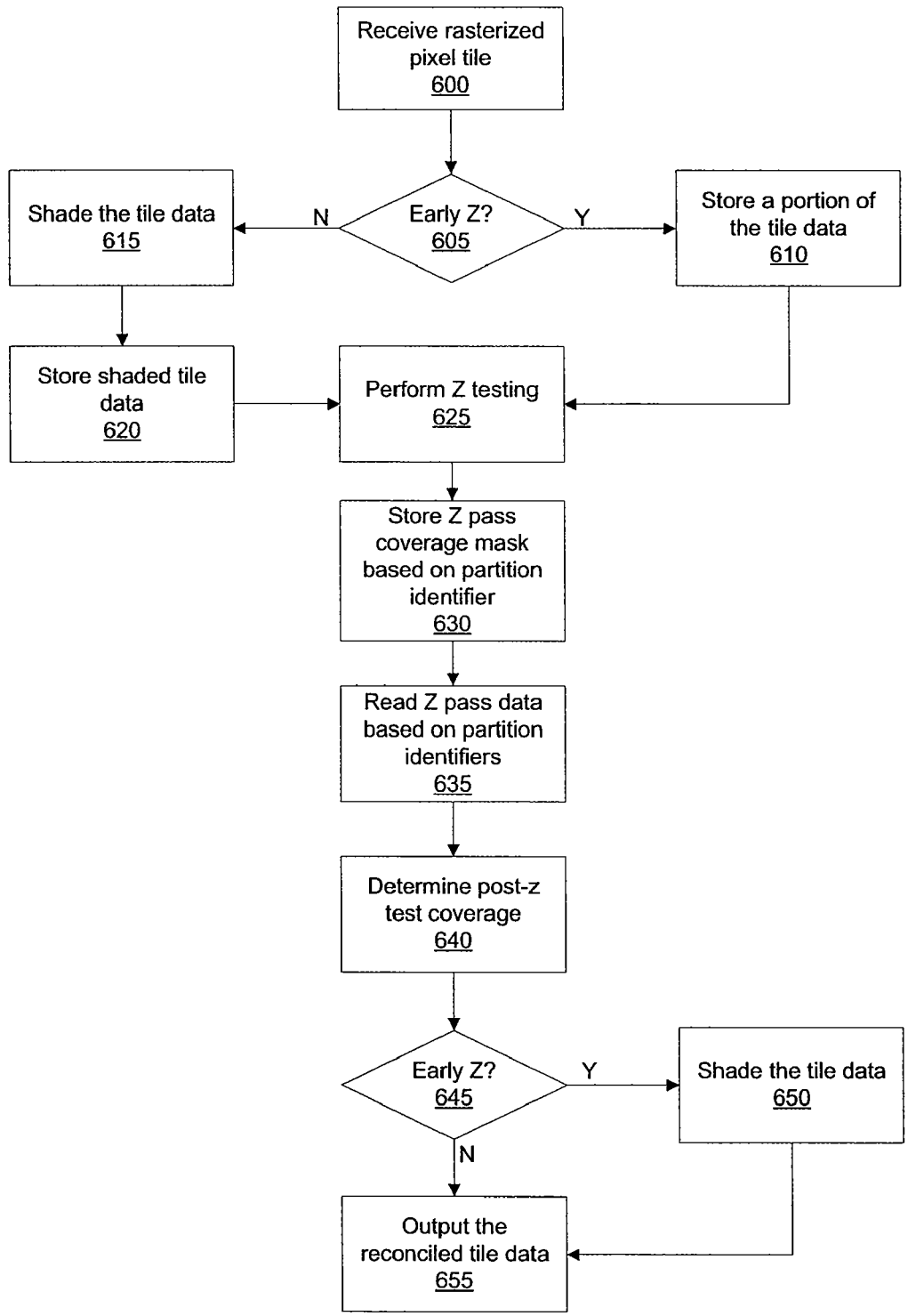
FIG. 6 illustrates an embodiment of a method of using reconciled pixel tile data for late and early z processing in accordance with one or more aspects of the present invention.

FIG. 6 illustrates an embodiment of a method of using reconciled tile data for late and early z testing, in accordance with one or more aspects of the present invention. In step 600 PROP unit 520 receives a rasterized pixel tile from rasterizer 205. In step 605 PROP unit 520 determines if the z test mode specifies early z testing, and, if so, in step 610 mux 505 selects a first portion of the rasterized pixel tile data that includes shader input parameters for storage with the ZROP partition identifier in z latency FIFO 530 and proceeds to step 625. Mux 505 outputs a second portion of the rasterized pixel tile data that includes z parameters for output to ZROP unit 270.

If, in step 605 PROP unit 520 determines that the z test mode does not specify early z testing, i.e., the z test mode specifies late z testing, then in step 615 mux 515 outputs the rasterized pixel tile received by PROP unit 520 from rasterizer 205 to shader engine 500 for shading. In step 620 shader engine 500 returns the shaded pixel tile to PROP unit 520 and mux 505 selects a first portion of the shaded pixel tile data that includes shaded color values for storage with the ZROP partition identifier in z latency FIFO 530 and proceeds to step 625. Mux 505 outputs a second portion of the shaded pixel tile data that includes z parameters or z values for output to ZROP unit 270.

In step 625 ZROP unit 270 performs z testing using the z parameters or z values received from PROP unit 520 to produce a z pass coverage mask. In step 630 the z pass mask and ZROP partition identifier are received by PROP unit 520 and stored in multi-threaded z pass FIFO 510 based on the ZROP partition identifier. In step 635, reconciler 540 reads the z pass coverage mask using the ZROP partition identifier(s) popped from z latency FIFO 530. In step 640 reconciler 540 computes the post-z test coverage mask for the pixel tile. In step 645 PROP unit 540 determines if the z test mode specifies early z testing, and, if so, in step 650 mux 515 selects the reconciled pixel data that includes shader input parameters output by reconciler 540 for output to shader engine 500 for shading and proceeds to step 655. If, in step 645 PROP unit 540 determines that the z test mode does not specify early z testing, i.e., the z test mode specifies late z testing, then PROP unit 520 proceeds directly to step 655. In step 655 PROP unit 520 outputs the shaded tile data to CROP unit 260 via mux 525. When the z test mode specifies early z testing mux 525 selects the shaded tile data received by PROP unit 520 from shader 500 for output as the shaded tile data. When the z test mode specifies late z testing mux 525 selects the reconciled tile data output by reconciler 540 as the shaded tile data.

In summary, rendering performance may be improved by shading when an early z testing mode is used to eliminate non-visible samples. PROP unit 520 may be configured for early or late z testing while matching the z pass data received from the ZROP units 270 and data packets for each pixel tile. Inclusion of z crossbar 230 and color crossbar 235 permits the number of shader engines 200 or 500 to vary from the number of ZROP units 270 and CROP units 260, allowing for shading and backend pixel processing, i.e., hidden surface removal performance and blending, to be scaled independently and for any shader engine 200 or 500 to process pixel tiles for any memory partition.

Figure 7A:
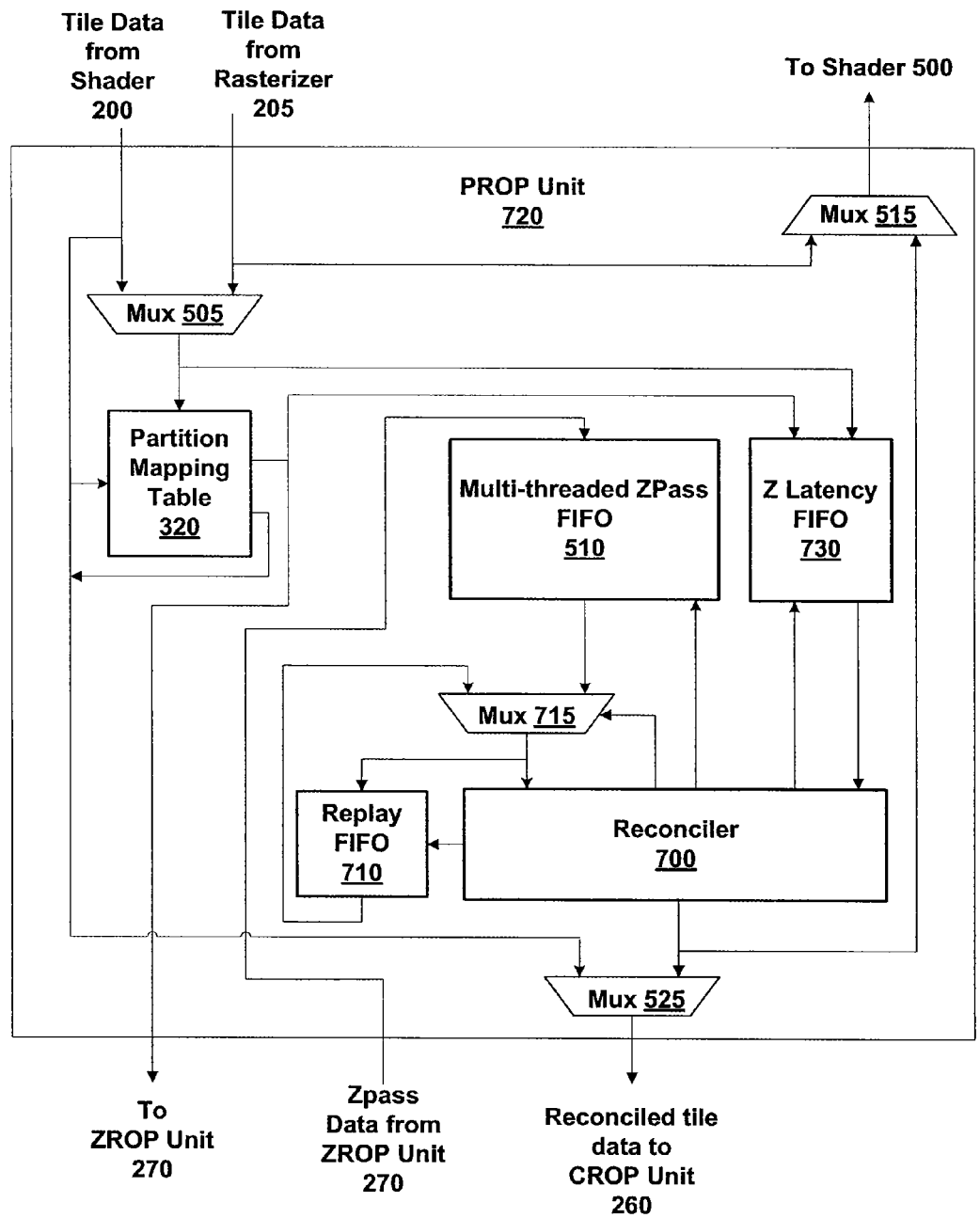
FIG. 7A is another block diagram of the PROP of FIG. 5B that is configured for processing multiple render target z pass data in accordance with one or more aspects of the present invention.
Figure 8A:
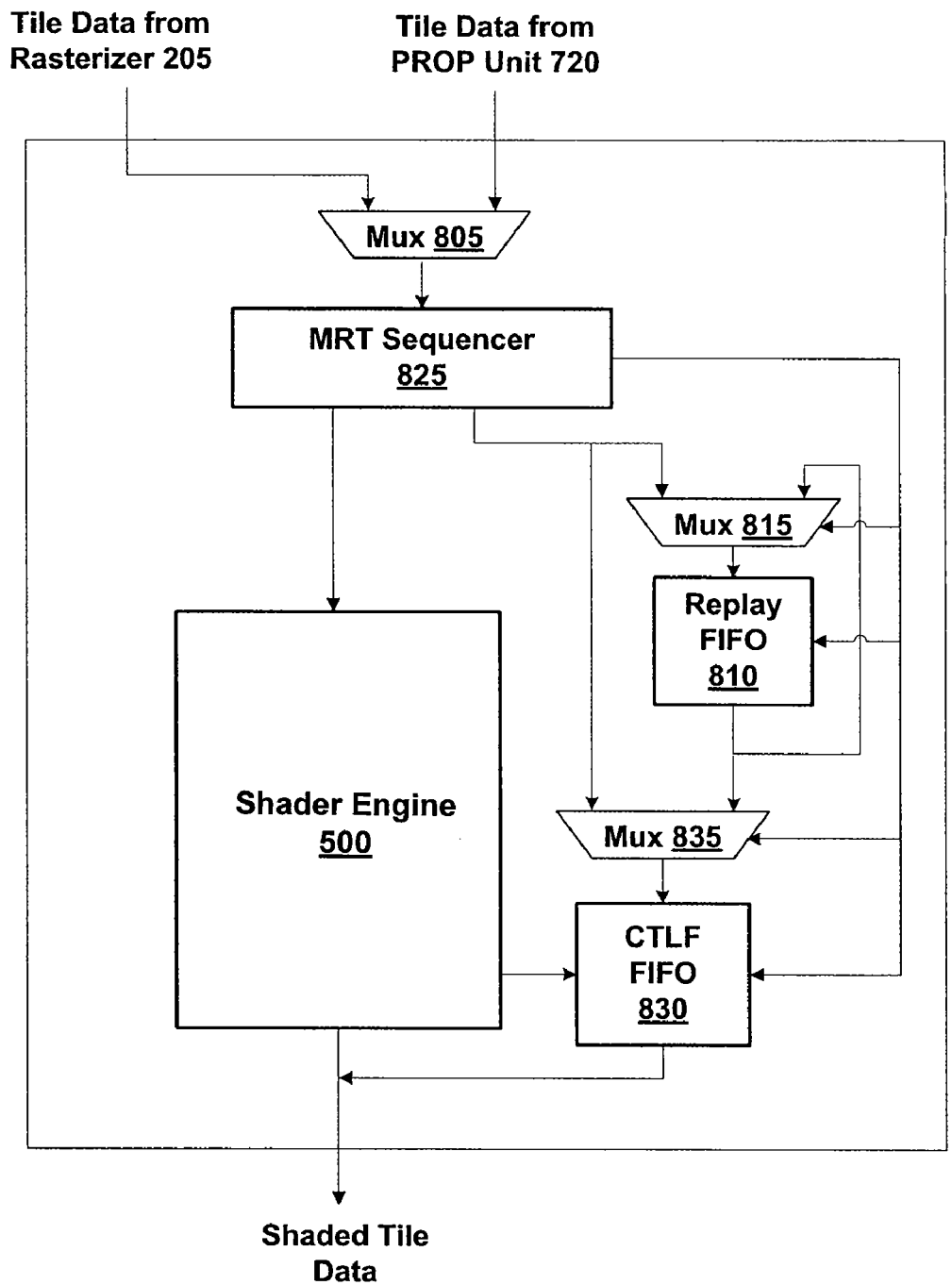
FIG. 8A is a block diagram of the shader engine of FIG. 5B that is configured for processing multiple render target z pass data in early z mode in accordance with one or more aspects of the present invention.

As described in conjunction with FIGS. 7A and 8A, PROP units 220 and 520 may also support multiple render targets that share the same z pass data without performing z testing for each one of the multiple render targets. In particular, the z testing is performed once for all of the multiple render targets and the z pass coverage mask is "replayed" for each one of the render targets to produce a post-z pass coverage mask for each one of the render targets. It is advantageous to perform the z testing once for multiple render targets rather than performing z testing for each render target.

FIG. 7A is another block diagram of PROP unit 520 of FIG. 5B that is configured for processing multiple render target z pass data, in accordance with one or more aspects of the present invention. A PROP unit 720 is configured to perform the functions of PROP unit 520 in addition to supporting replaying of z pass data for multiple render targets when the late z testing mode is used. PROP unit 720 includes a multiplexer, mux 715 and a replay FIFO 710. As previously described in conjunction with FIG. 3, the z pass data, e.g., z pass coverage mask for a pixel tile, received from a ZROP unit 270 via z crossbar 230 is stored in multi-threaded z pass FIFO 510 and matched with one or more color packets stored in a z latency FIFO 730 that performs the function of z latency FIFO 530. In addition to storing shaded color values, a pixel tile position, a rasterized coverage mask, partition identifiers, an eozp flag, each color packet also stores flags indicating if the data packet is for the first render target and if the data packet is for the last render target in a pixel tile segment.

When multiple render targets are used, pixel tiles are grouped into pixel tile segments, where each pixel tile segment includes a portion of the pixel tiles for each one of the render targets. When the render targets share a z buffer and the primitives share z parameters, z testing may be performed once for each segment of pixel tiles. A single pixel tile segment includes a pass of data packets for each one of the multiple render targets. The first pass of each pixel tile segment also includes z parameters for each pixel tile in the segment. The z parameters are used for every pass within a pixel tile segment to produce z pass coverage masks for every data packet. The z parameters may also include z values for output to ZROP unit 270 (not shown in FIG. 7A). When reconciler 700 uses the z pass coverage mask to produce post-z test coverage masks for the first render target in a pixel tile segment, mux 715 selects the z pass coverage mask read from multi-threaded z pass FIFO 510 for output to reconciler 700. When reconciler 700 pops the z pass coverage mask from multi-threaded z pass FIFO 510, reconciler 700 also asserts a push signal input to replay FIFO 710 in order to store the z pass coverage mask for the first render target in replay FIFO 710 for output with a subsequent pass of data packets.

Replay FIFO 710 is sized to store the z pass coverage masks corresponding to a pixel tile segment. Each coverage packet is a z coverage mask for a pixel tile. After the pixel tiles for the first render target in the sequence are processed by reconciler 700, reconciler 700 reads and pops the coverage packets stored in replay FIFO 710 to copy the coverage packets for additional render targets. Mux 715 selects the coverage packets provided by replay FIFO 710 for output to reconciler 700. The popped coverage packets are pushed back into replay FIFO 710 to process each subsequent render target in the pixel tile segment, until the last render target is processed. When the last render target is processed coverage packets are popped from replay FIFO 710 by reconciler 700, but those same coverage packets are not pushed back into replay FIFO 710. In this manner, replay FIFO 710 is emptied for processing another pixel tile segment. Replay FIFO 710 is used to replay z pass data when late z testing used. When early z testing is used, another replay FIFO is used, as described in conjunction with FIG. 8A.

Figure 7B:
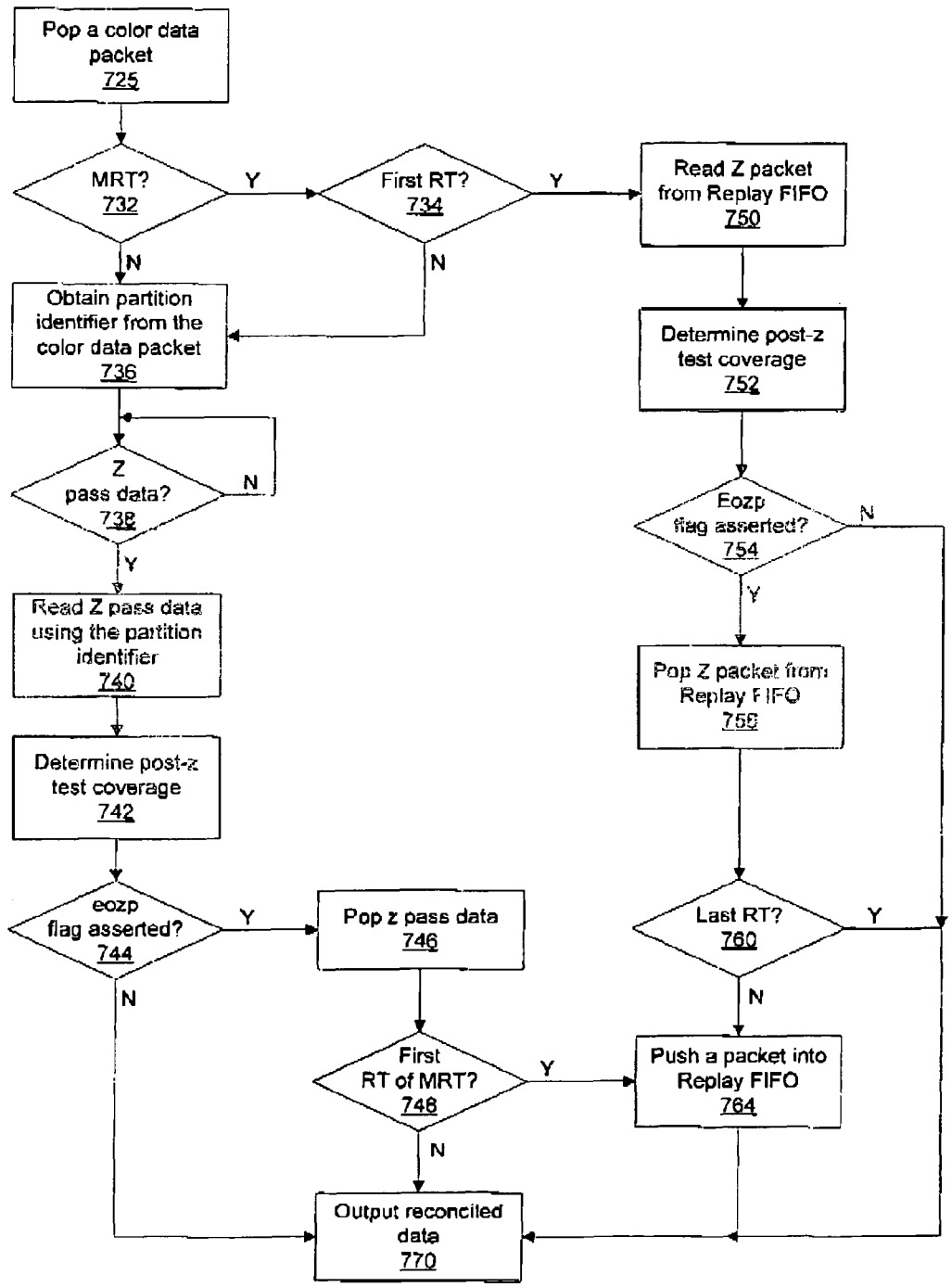
FIG. 7B illustrates an embodiment of a method of processing z pass data and data packets to produce reconciled pixel tile data for multiple render targets in accordance with one or more aspects of the present invention.

FIG. 7B illustrates an embodiment of a method of processing z pass data and data packets to produce reconciled tile data for multiple render targets, in accordance with one or more aspects of the present invention. In step 725 reconciler 700 pops a data packet from z latency FIFO 730. In step 732 reconciler 700 determines if multiple render targets are being processed, and, if not, reconciler 700 proceeds to step 736. In step 734 reconciler 700 determines if the data packet is for the first render target of the multiple render targets, and, if not reconciler 700 proceeds to step 736. In step 736, reconciler 700 obtains the ZROP partition identifier from the data packet. In step 738, reconciler 700 determines if a z pass coverage mask is stored in multi-threaded z pass FIFO 510 for the ZROP partition identifier, and, if not, reconciler 700 repeats step 738, waiting for PROP unit 720 to receive a z pass coverage mask from ZROP Unit 270.

When a z pass coverage mask for the partition is available, in step 740 reconciler 700 reads the z pass coverage mask using the ZROP partition identifier, reading the first entry in multi-threaded z pass FIFO 510 for the partition. Notably, the first entry is not necessarily popped since each z pass coverage mask may correspond to more than one data packet. Multi-threaded z pass FIFO 510 allows for an entry to be read without being popped. In step 742 reconciler 700 computes the post-z pass coverage mask for the data packet by performing a bit-wise AND between the portion of the rasterized coverage mask included in the data packet and the corresponding portion of the z pass coverage mask read in step 740.

In step 744 reconciler 700 determines if the eozp flag in the color data indicates that the data packet is the last data packet for a pixel tile, and, if not, reconciler 700 proceeds directly to step 770. Otherwise, in step 746 reconciler 700 pops the z pass coverage mask read in step 740 from multi-threaded z pass FIFO 510. In step 748 reconciler 700 determines if the data packet is for a first render target of multiple render targets, and, if not, reconciler 700 proceeds directly to step 770. Otherwise, in step 764, reconciler 700 pushes a coverage packet containing the z pass coverage mask for the pixel tile into replay FIFO 710 and then proceeds to step 770. In step 770 reconciler 700 outputs the reconciled tile data including the shaded color values for the samples in the data packet, the post-z test coverage mask for the samples, the data packet screen position, a color tile physical address, and the color buffer partition identifier, to CROP unit 260 in raster operations unit 160.

If, in step 734 reconciler 700 determines that the data packet is for the first render target of the multiple render targets, then in step 750 reconciler 700 reads the first coverage packet from replay FIFO 710. Notably, reconciler 700 reads the first coverage packet without popping it, since the same coverage packet may be used to process more than one data packet. In step 752 reconciler 700 computes the post-z pass coverage mask for the data packet by performing a bit-wise AND between the portion of the rasterized coverage mask included in the data packet and the corresponding portion of the z pass coverage mask read in step 750.

In step 754 reconciler 700 determines if the eozp flag in the data packet indicates that the data packet is the last data packet for the pixel tile, and, if not, reconciler 700 proceeds directly to step 770. Otherwise, in step 756 reconciler 700 pops the z pass coverage mask read in step 740 from replay FIFO 710. In step 760 reconciler 700 determines if the data packet is for a last render target of multiple render targets, and, if not, reconciler 700 proceeds directly to step 770. Otherwise, in step 764, reconciler 700 pushes a coverage packet containing the z pass coverage mask for the pixel tile into replay FIFO 710 and then proceeds to step 770.

Reconciler 700 uses replay FIFO 710 and mux 715 to avoid performing z testing for every render target when multiple render targets are used. Storing the z pass data in replay FIFO 710 requires a small amount of storage to improve the z testing processing throughput since z testing is only performed once for each pixel tile segment. In some embodiments of the present invention, replay FIFO 710 is implemented as an additional thread of multi-threaded zpass FIFO 510. When early z testing is specified, the z pass data may be replayed for each render target using a similar mechanism in the shader engine, as described in conjunction with FIG. 8A. When multiple render targets are used, an entry of replay FIFO 710 is read, but not popped until the last pass. A single thread suffices since data is pushed and popped in the thread in the same order as in the z latency FIFO 730. When early z testing is used, PROP unit 720 processes pixel tiles received from rasterizer 205 that have not been broken into pixel tile segments. Therefore, replay FIFO 710 and mux 715 are not used for early z testing.

FIG. 8A is a block diagram of shader engine 500 and portions of PROP unit 520 of FIG. 5B that is configured for processing multiple render target z pass data in early z mode, in accordance with one or more aspects of the present invention. Portions of PROP unit 520 include an MRT (multiple render target) sequencer 825, a replay FIFO 810, a CTLF (color tile latency) FIFO 830, and muxes 805, 815, and 835. Shading engine 500 is configured to execute shader program instructions to process the rasterized pixel tiles and produce shaded color data for the pixel tiles. Shading engine 500 may be configured to read texture data and perform texture mapping operations in addition to shading operations known to those skilled in the art.

Mux 805 selects pixel tiles for output to MRT sequencer 825 based on the z testing mode. When the early z testing mode is specified, pixel tiles that include post-z test coverage masks produced by reconciler 540 or 700 are output to MRT sequencer 825. When the late z testing mode is specified, pixel tiles from rasterizer 205 are output to MRT sequencer 825. When early z testing mode is specified, the pixel tiles advantageously include only surviving data packets. MRT sequencer 825 divides the pixel tiles into pixel tile segments when multiple render targets are used. In some embodiments of the present invention, MRT sequencer generates pixel tiles for multiple render targets using pixel tiles that are received from rasterizer 205 (when the late z testing mode is specified) and from PROP unit 720 (when the early z testing mode is specified). MRT sequencer 825 outputs the data packets for the pixel tiles to shading engine 500 for processing. The data packets include shader input parameters that are processed by shading engine 500 to produce color values. MRT sequencer 825 outputs coverage packets for the pixel tiles and the post-z test coverage masks to mux 815.

MRT sequencer 825 also provides a first render target signal and a last render target signal to mux 815, replay FIFO 810, mux 835, and CTLF FIFO 830. Replay FIFO 810 stores (x,y) and coverage packets for the color data in shading engine 500. The (x,y) and coverage packets need to be injected into CTLF FIFO 830 for each render target, so the (x,y) and coverage packets are available to properly qualify and route the color data received from shading engine 500. The first render target signal indicates that a coverage packet is for the first render target of the multiple render targets and it is used to select the coverage packet output by MRT sequencer 825 for input to replay FIFO 810, via mux 815. The inversion of the last render target signal is also used as a push signal to store the coverage packets for the first render target in replay FIFO 810. Similarly, the inversion of the first render target signal is also used as a pop signal to remove the coverage packets from replay FIFO 810 to "copy" the coverage packets for output by mux 835 for each render target after the first render target. Therefore, coverage packets are stored into replay FIFO 810 for each render target, except for the last render target. This drains replay FIFO since coverage packets are popped and not pushed for the last render target in preparation for a new sequence of pixel tiles. When the first render target signal is not asserted, mux 815 selects the output of replay FIFO 810 for storage in replay FIFO 810.

CTLF FIFO 830 receives coverage packets from MRT sequencer 825 via mux 825 when the first render target signal is asserted. Otherwise, CTLF FIFO 830 receives coverage packets from replay FIFO 810. CTLF FIFO 830 pushes each coverage packet and stores the coverage packets to accommodate the latency of shading engine 500. Shading engine 500 pops the coverage packets and outputs them with the shaded pixel tiles to CROP unit 360 via PROP unit 520 or 720.

Figure 8B:
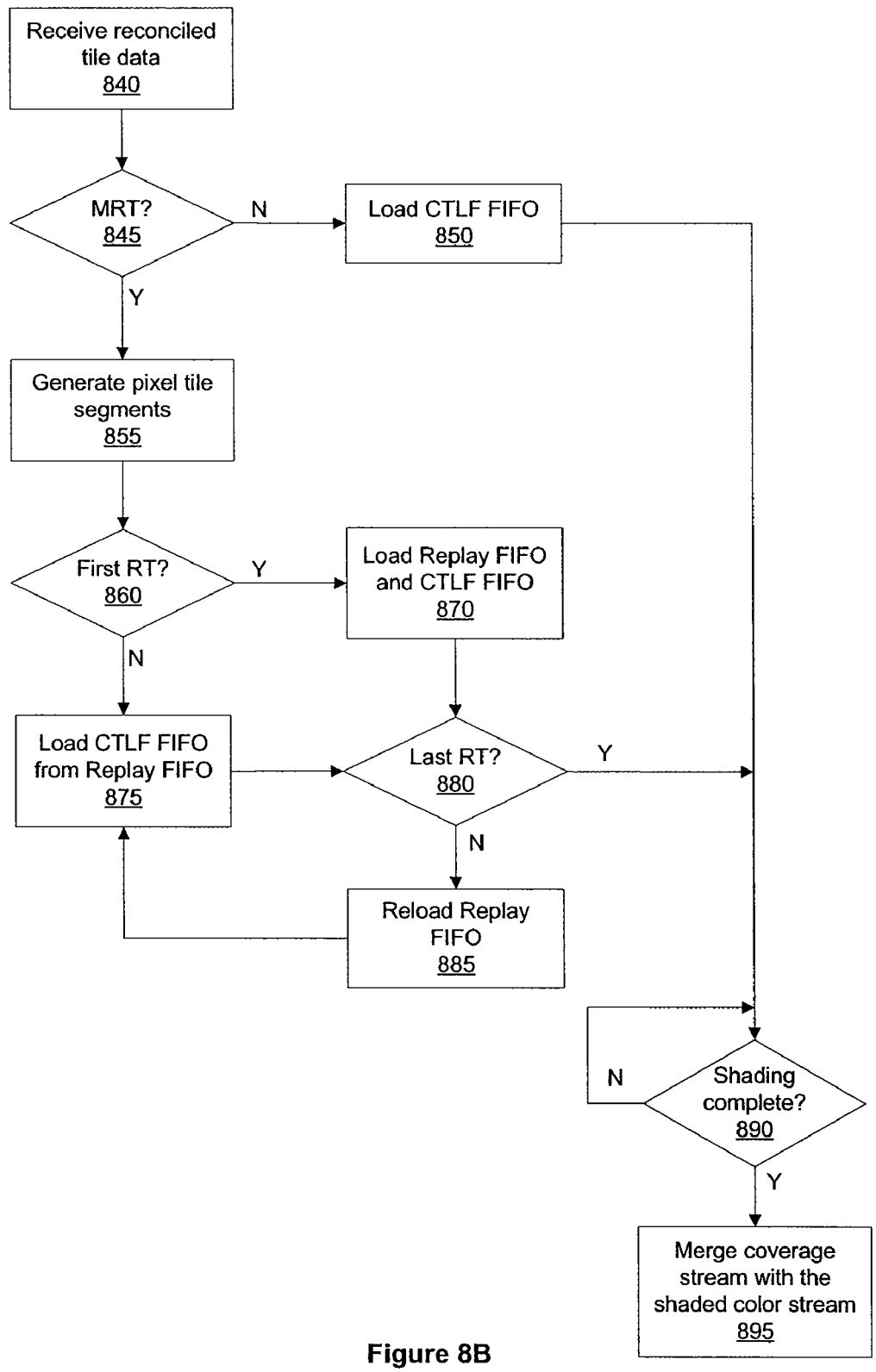
FIG. 8B illustrates an embodiment of a method of processing z pass data and data packets to produce reconciled pixel tile data for multiple render targets during early z testing in accordance with one or more aspects of the present invention.

FIG. 8B illustrates an embodiment of a method of processing post-z pass data and data packets to produce reconciled tile data for multiple render targets during early z testing, in accordance with one or more aspects of the present invention. In step 840 shader engine 500 is configured in an early z testing mode and receives reconciled pixel tile data from PROP unit 720. In step 845 shader engine 500 determines if multiple render targets are specified, and, if not, in step 850 coverage packets for a single render target are output by MRT sequencer 825 and stored in CTLF FIFO 830. In step 890 shading engine 500 determines if the data packets corresponding to the coverage packets have been shaded, and, if not, step 890 is repeated until the shading is completed. When shading engine 500 determines that the shading is complete, shading engine 500 pops the coverage packets from CTLF FIFO 830 in step 895 and merges the coverage stream, e.g., post-z pass coverage masks, with the shaded color stream, e.g., data packets, output by shading engine 500 to produce shaded pixel tiles that are output to CROP unit 360 via PROP unit 520 or 720.

If, in step 845 shader engine 500 determines that multiple render targets are specified, then in step 855 MRT sequencer 825 generates pixel tile segments. In step 860 MRT sequencer 825 determines if the data packets are for the first render target of the multiple render targets, and, if so in step 870 muxes 815 and 835 are configured to select the coverage packets output by MRT sequencer 825 for output to replay FIFO 810 and CTLF FIFO 830, respectively, replay FIFO 810 and CTLF FIFO 830 are configured to store the coverage packets. If, in step 860 MRT sequencer 825 determines that the data packets are not for the first render target of the multiple render targets, then in step 875 mux 835 and replay FIFO 810 are configured to store coverage packets popped from replay FIFO 810 in CTLF FIFO 830.

In step 880 MRT sequencer 825 determines if the data packets are for the last render target of the multiple render targets, and, if so shader engine 500 proceeds directly to step 890. Otherwise, in step 885 mux 815 is configured to select the coverage packets output by replay FIFO 810 for input to replay FIFO 810 and replay FIFO 810 is configured to store the coverage packets, reloading replay FIFO 810 for another render target before returning to step 875 to copy the coverage packets for another render target.

Figure 9:
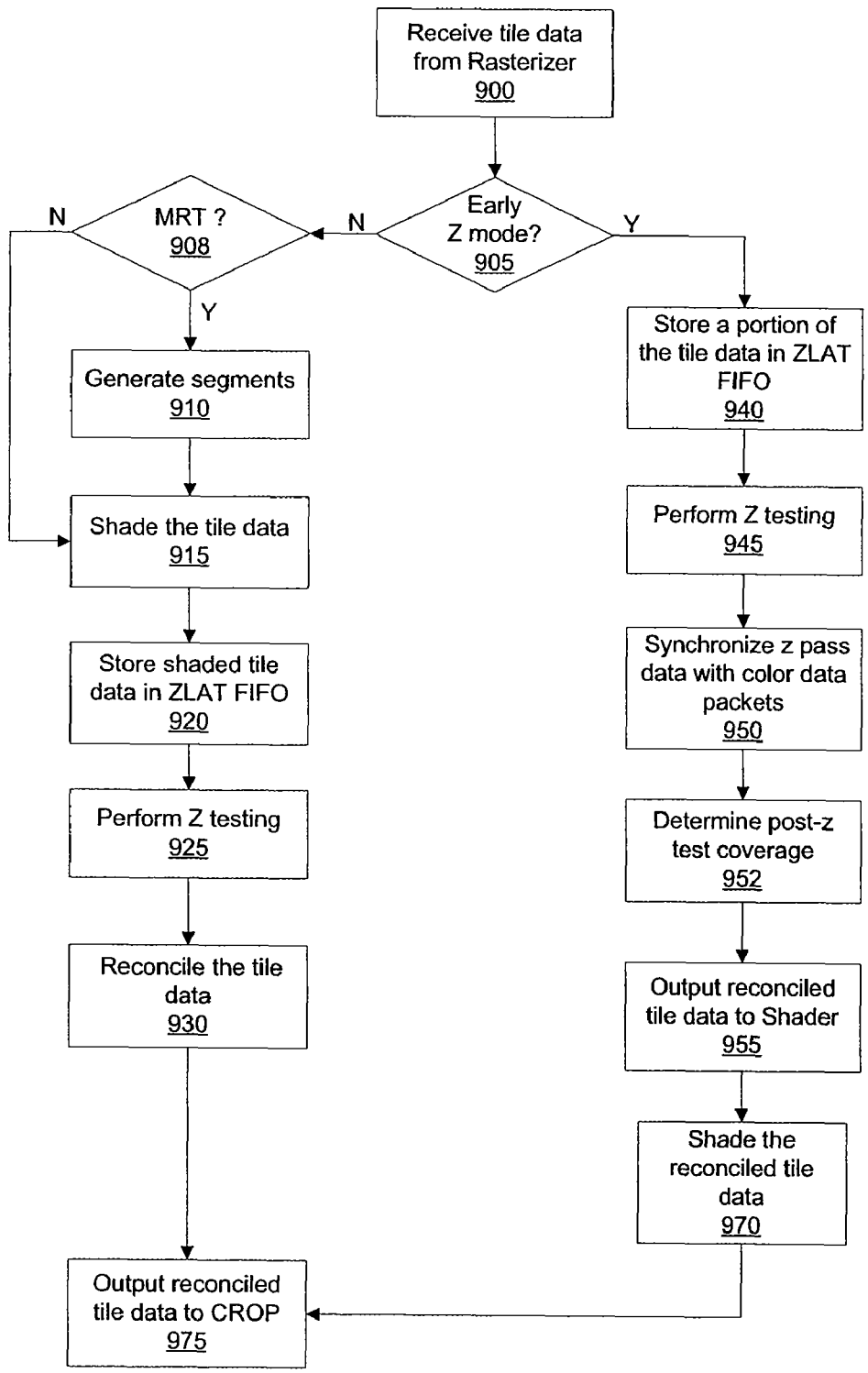
FIG. 9 illustrates an embodiment of a method of using reconciled tile data for late and early z testing with multiple render targets in accordance with one or more aspects of the present invention.

FIG. 9 illustrates an embodiment of a method of using reconciled tile data for late and early z testing with multiple render targets, in accordance with one or more aspects of the present invention. In step 900 PROP unit 720 receives pixel tile data from rasterizer 205. In step 905 PROP unit 720 determines if the z test mode specifies that early z testing is used, and, if not, the late z testing is used and PROP unit 720 proceeds to step 908. In step 908 PROP unit 720 outputs the pixel tile data received from rasterizer 205 to shader engine 500 without processing the data and shader engine 500 determines if multiple render targets are specified, and, if not, shader engine 500 proceeds directly to step 915. Otherwise, in step 910 shader engine 500 generates pixel tile segments that each include a pass of data packets for each render target. The first pass of each segment also includes z parameters for each pixel tile. The z parameters are used for each pass within a segment.

In step 915 the pixel tile data is shaded by shader engine 500 and output to PROP unit 720. In step 920 PROP unit 720 stores a portion of the pixel tile data that includes the shaded color data as data packets in z latency FIFO 730. In step 925 PROP unit 720 outputs the z parameters included in the pixel tile data to ZROP unit 270 for processing to produce a z pass coverage mask for each pixel tile. In step 930 PROP unit 720 completes the steps shown in FIG. 7B to produce reconciled pixel tiles. In step 975 PROP unit 720 outputs the reconciled pixel tiles, including shaded color data to CROP unit 260.

If, in step 905 PROP unit 720 determines that the z test mode specifies that early z testing is used, then in step 940 PROP unit 720 stores a portion of the pixel tile data that includes the rasterized color data as data packets in z latency FIFO 730. In step 945 PROP unit 720 outputs the z parameters included in the pixel tile data to ZROP unit 270 for processing to produce a z pass coverage mask for each pixel tile. In step 950 PROP unit 720 synchronizes the z pass coverage mask for each pixel tile with the rasterized color data for each pixel tile. In step 952 PROP unit 720 produces reconciled pixel tile data including post-z test coverage masks and in step 955 PROP unit 720 outputs the reconciled pixel tile data to shader engine 500.

In step 970 shader engine 500 completes the steps shown in FIG. 8B to produce shaded pixel tile data that is output to PROP unit 720. In step 975 PROP unit 720 outputs the reconciled pixel tiles, including shaded color data to CROP unit 260.

Persons skilled in the art will appreciate that any system configured to perform the method steps of FIG. 4, 6, 7B, 8B, or 9, or their equivalents, are within the scope of the present invention. The current invention involves new systems and methods for computing per-sample post-z test coverage when the memory is organized in multiple partitions and the number of z raster operations units may not match the number of shader engines. A multi-threaded FIFO is used to store z pass data produced by the z raster operations units and the z pass data is matched to corresponding color tile data to produce per-sample coverage data. The color tile data may include shaded colors when a late z testing mode is used or shader input parameters when an early z testing mode is used. Rendering performance may be improved by shading when an early z testing mode is used to eliminate non-visible sample. Z testing performance may be improved when multiple render targets are used by performing the z testing once for the multiple render targets and copying the z test results for each render target in the multiple render targets. The copying of z test results may be used during early or late z testing.

While the foregoing is directed to embodiments of the present invention, other and further embodiments of the invention may be devised without departing from the basic scope thereof, and the scope thereof is determined by the claims that follow. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A method of performing early z testing for multiple render targets that are associated with a common z buffer, comprising:
   receiving data packets of reconciled pixel tile data for multiple render targets that include post-z test coverage masks indicating covered samples within pixel tiles, wherein the covered samples are within a graphics primitive and passed the early z testing;
   shading a portion of the reconciled pixel tile data to produce shaded color values for each of the covered samples within the pixel tiles;
   determining that the multiple render targets are specified; and
   copying the post-z test coverage masks for each one of the multiple render targets to produce additional post-z test coverage masks,
   wherein each of the data packets includes a first indicator as to whether the data packets are associated with a first render target and a second indicator as to whether the data packets are associated with a last render target.

2. The method of claim 1, further comprising merging the post-z test coverage masks and the additional post-z test coverage masks with the shaded color values to produce shaded pixel tiles for each of the multiple render targets.

3. The method of claim 2, wherein the pixel tile data includes a partition identifier that corresponds to a single partition of memory that is constructed of multiple partitions to store the shaded color values for the multiple render targets.

4. The method of claim 3, further comprising routing each one of the shaded pixel tiles to a single color raster operations unit of multiple color raster operations units based on the partition identifier corresponding to each one of the shaded pixel tiles.

5. The method of claim 3, further comprising early z testing each one of the pixel tiles using a single z raster operations unit of multiple z raster operations units that corresponds to the partition identifier corresponding to each one of the pixel tiles.

6. The method of claim 3, further comprising reading the partition identifier for each pixel tile from a mapping table using a screen space position of the pixel tile and render target information.

7. The method of claim 2, wherein a number of shader units used to shade the portion of the pixel tile data to produce shaded color values for each of the covered samples within the pixel tiles is not equal to a number of partitions of memory that is constructed of multiple partitions to store the shaded color values for the multiple render targets.

8. The method of claim 1, further comprising separating the reconciled pixel tile data into multiple segments to produce the portion of the reconciled pixel tile data, wherein each segment includes passes of pixel tiles and each one of the passes corresponds to one of the multiple render targets.

9. The method of claim 8, further comprising loading a replay first-in first-out memory with a portion of the post-z test coverage masks corresponding to the first pass of a segment of the multiple segments to copy the portion of the post-z test coverage masks for remaining passes of the segment.

10. The method of claim 9, further comprising unloading the replay first-in first-out memory by popping the portion of the post-z test coverage masks for a last pass of the passes included in one of the multiple segments.

11. The method of claim 9, wherein the replay FIFO is implemented as an additional thread of a multi-threaded FIFO.

12. A system for performing early z testing for multiple render targets that are associated with a common z buffer, comprising:
a replay first-in first-out (FIFO) memory configured to store post-z test coverage masks corresponding to pixel tiles for one of the multiple render targets and reload the post-z test coverage masks to copy the post-z test coverage masks for the multiple render targets, wherein the post-z test coverage masks indicate covered samples of the pixel tiles that are within a graphics primitive and passed the early z testing; and
a shader engine configured to shade the pixel tiles to produce shaded color values for each of the covered samples within the pixel tiles and merge the shaded color values with the post-z test coverage masks and copied post-z test coverage masks to produce data packets of shaded pixel tiles for the multiple render targets,
wherein each of the data packets includes a first indicator as to whether the data packets are associated with a first render target and a second indicator as to whether the data packets are associated with a last render target.

13. The system of claim 12, further comprising a multiple render target sequencer coupled to the replay FIFO and the shader engine and configured to separate the pixel tiles into multiple segments for input to the shader engine, wherein each segment includes passes of pixel tiles and each one of the passes corresponds to one of the multiple render targets.

14. The system of claim 12, further comprising a color tile latency FIFO that is coupled between the replay FIFO and the shader engine and configured to store the post-z test coverage masks and the copied post-z test coverage masks that are merged with the shaded color values.

15. The system of claim 12, further comprising a memory constructed of multiple partitions configured to store the shaded color values for the multiple render targets, wherein each pixel tile is mapped to one of the multiple partitions and each one of the multiple render targets is divided into portions that are stored in the multiple partitions.

16. The system of claim 15, further comprising multiple z operations units configured to perform the early z testing to produce the post-z test coverage masks, wherein each one of the multiple z operations units corresponds to one of the multiple memory partitions.

17. The system of claim 15, further comprising a partition mapping table that is configured to store partition identifiers for each pixel tile position, wherein the partition identifiers are included in the shaded pixel tiles.

18. The system of claim 17, further comprising a color crossbar configured to route each one of the shaded pixel tiles output by the shader engine to a raster operations unit based on the partition identifier corresponding to each one of the shaded pixel tiles.

19. The system of claim 12, further comprising a first multiplexer configured to output post-z test coverage masks popped from the replay FIFO for storage in the replay FIFO to produce the copied post-z test coverage masks for the multiple render targets.

20. The system of claim 12, wherein the replay FIFO is implemented as an additional thread of a multi-threaded FIFO.

* * * * *